United States Patent
Keller et al.

(10) Patent No.: US 9,338,641 B2
(45) Date of Patent: May 10, 2016

(54) ENHANCED HANDLING OF ACCESS CAPABILITY INFORMATION IN A MOBILE NETWORK

(75) Inventors: Ralf Keller, Wurselen (DE); Jesus-Angel De-Gregorio-Rodriguez, Madrid (ES); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 212 days.

(21) Appl. No.: 14/001,021

(22) PCT Filed: Feb. 22, 2012

(86) PCT No.: PCT/EP2012/053031
§ 371 (c)(1),
(2), (4) Date: Aug. 22, 2013

(87) PCT Pub. No.: WO2012/113842
PCT Pub. Date: Aug. 30, 2012

(65) Prior Publication Data
US 2013/0329647 A1 Dec. 12, 2013

Related U.S. Application Data

(60) Provisional application No. 61/543,095, filed on Oct. 4, 2011, provisional application No. 61/445,249, filed on Feb. 22, 2011.

(51) Int. Cl.
*H04W 4/00* (2009.01)
*H04W 8/22* (2009.01)
(Continued)

(52) U.S. Cl.
CPC ............... *H04W 8/22* (2013.01); *H04W 8/04* (2013.01); *H04W 60/04* (2013.01)

(58) Field of Classification Search
CPC .................................. H04W 8/04; H04W 8/22
USPC .......................... 370/328, 329, 347, 331–338
See application file for complete search history.

(56) References Cited

U.S. PATENT DOCUMENTS 8,917,710 B2 * 12/2014 Zhang ................. H04W 76/021
370/328
8,948,087 B2 * 2/2015 Hu .......................... H04L 45/04
370/328

(Continued)

FOREIGN PATENT DOCUMENTS

WO 2008067832 A1 6/2008
WO 2011000672 A1 1/2011

OTHER PUBLICATIONS

WO2010148754.*

(Continued)

*Primary Examiner* — Chuong T Ho
(74) *Attorney, Agent, or Firm* — Rothwell, Figg, Ernst & Manbeck, P.C.

(57) ABSTRACT

In a mobile network with a plurality of access networks, a control node, which is controlling access of a user equipment to that one of the access networks which is currently used by the user equipment, performs a determination of an access capability of the user equipment in this access network. The control node provides an indication of the determined access capability to a subscriber database associated with the user equipment. When transmitting the indication, a guard timer is started. After determining the access capability, the control node receives an update indication for the user equipment. In response to receiving the update indication, the control node performs a redetermination of the access capability. Further, the control node checks if the guard timer has expired and, only if the guard timer has not expired, provides a further indication of the redetermined access capability to the subscriber database.

24 Claims, 12 Drawing Sheets

(51) Int. Cl.
*H04W 8/04* (2009.01)
*H04W 60/04* (2009.01)

(56) References Cited

U.S. PATENT DOCUMENTS

2012/0106324 A1* 5/2012 Keller ................... H04W 48/18
370/225
2012/0269117 A1* 10/2012 Hu ........................... H04L 45/04
370/328

OTHER PUBLICATIONS

Motorola, "Registering Terminal's CSI Capability" S2-051325, Internet Citation, 2005, XP-002396152, retrieved from http://www.3gpp.org/ftp/tsg_sa/WG2_Arch/TSGS2_46_Athens/Docs/, 2 pages.

3rd Generation Partnership Project; Technical Specification Group Services and System Aspects; General Packet Radio Service (GPRS); Service description; Stage 2 (Release 7), 3GPP Standard; 3GPP TS23.060 V7.10.0, 2010, 217 pages.

3rd Generation Partnership Project; Technical Specification Group Services and System Aspects; Architecture requirements (Release 8), 3GPP Standard; 3GPP TS 23.221 V8.7.0, 2010, 47 pages.

3rd Generation Partnership Project; Technical Specification Group Services and System Aspects; IP Multimedia Subsystem (IMS) centralized services; Stage 2 (Release 10), 3GPP Standard; 3GPP TS 23.292 V10.2.0, 2010, 110 pages.

3rd Generation Partnership Project; Technical Specification Group Services and System Aspects; General Packet Radio Service (GPRS) enhancements for Evolved Universal Terrestrial Radio Access Network (E-UTRAN) access; (Release B), 3GPP Standard; 3GPP TS 23.401 V8.12.0, 2010, 242 pages.

http://www.3gpp.org/ftp/specs/archive/, 2013, 1 page.

* cited by examiner

| Termination in | CS | CS | LTE | CS | CS in case of SRVCC | CS in case of SRVCC |
|---|---|---|---|---|---|---|
| MSC attached | X | X | - | - | X | X |
| MSC-S registered | - | X | - | X | X | X |
| IMS registered by UE | - | - | X | X | X | X |
| T-ADS cases | ICS Fallback | MSC enhanced for ICS | LTE, no CSFB; After SRVCC → See other cases | After SRVCC + ICS (interim state) – last call in CS | Idle mode mobility between LTE and CS (ICS Fallback); In case of SRVCC then last call setup in CS | Idle mode mobility between LTE and CS (MSC enhanced for ICS); In case of SRVCC then last call setup in CS |

ENHANCED HANDLING OF ACCESS CAPABILITY INFORMATION IN A MOBILE NETWORK

CROSS REFERENCE TO RELATED APPLICATION(S)

This application is a 35 U.S.C. §371 National Phase Entry Application from PCT/EP2012/053031, filed Feb. 22, 2012, designating the United States, and also claims the benefit of U.S. Provisional Application Nos. 61/445,249, filed Feb. 22, 2011 and 61/543,095, filed Oct. 4, 2011. The disclosures of each of the referenced applications are incorporated herein in their entirety by reference.

TECHNICAL FIELD

The present invention relates to methods of handling access capability information in a mobile network and to corresponding devices.

BACKGROUND

Mobile networks are currently evolving from pure circuit switched (CS) networks towards packet switched (PS) networks, in particular Internet Protocol (IP) based networks, and by that integrate into IP based infrastructures that are also used for the Internet, the World Wide Web and the datacom industry.

More specifically, technologies allowing voice communication over an IP based network have been introduced. Examples of such technologies are Voice over IP (VoIP) via DSL access or Voice over IP via WLAN access. In mobile networks, technologies allowing voice communication over an IP based network are being introduced as well. Examples of such mobile networks are mobile networks according to the Third Generation Partnership Project (3GPP) technical specifications (TSs).

For example, mobile network operators may install IMS (IP Multimedia Subsystem) networks and offer IMS services. It is desirable to make these services available also to subscribers typically using a CS access to the mobile network, e.g., subscribers of 2G and 3G networks such as subscribers of using Global Systems for Mobile Communications (GSM) access or a Wideband Code Division Multiplex (WCDMA) access, or other types of radio access technology (RAT). Other examples of 2G/3G RAT are General Packet Radio Service (GPRS), Enhanced Data Rates for GSM Evolution (EDGE) or Enhanced GPRS (EGPRS), Universal Mobile Telecommunications System (UMTS), and High Speed Packet Access (HSPA). Hereto, calls from and to this group of 2G/3G subscribers are routed through the IMS network in order for the IMS service engine to execute the call and call related services. This concept is called IMS Centralized Services (ICS). The IMS centralized Services specifications in 3GPP targets at using the CS access for access to IMS services, see 3GPP TS 23.292, and is complemented by IMS Service Continuity, see 3GPP TS 23.237.

Further, a technology referred to as Evolved Packet Core (EPC) is being introduced as part of the Evolved Packet System (EPS) of 3GPP Long Term Evolution (LTE), supporting a radio access network (RAN) referred to as Evolved UMTS Terrestrial Radio Access Network (E-UTRAN). In 3GPP LTE, voice communication is typically implemented using PS access, e.g. as Voice over IMS or using a technology referred to Voice over LTE via Generic Access (VoLGA), see the VoLGA stage 2 specification available on the internet at www.volgaforum.com. Another way to implement voice communication in an mobile network supporting with LTE radio access networks is to use CS Fallback (CSFB) to a 2G or 3G radio access networks, e.g. to a GSM EDGE Radio Access Network (GERAN) or to a UMTS Terrestrial Radio Access Network (UTRAN). The concept of CSFB is described in 3GPP TS 23.272. A study on the implementation of CS domain services in the EPS can be found in 3GPP Technical Report 23.879. It has also been proposed to implement single radio voice call continuity (SR-VCC), enabling inter domain Handover (HO) of an IMS voice call from PS domain to CS domain and vice versa (see 3GPP TS 23.216). It is desirable that SR-VCC may be combined with ICS for an IMS centralized solution supporting also SR-VCC from PS access via E-UTRAN or UTRAN to CS access via UTRAN or GERAN, and vice versa.

In the following, some aspects of mobility management in 3GPP will be described in more detail. FIGS. 1 and 2 schematically illustrate mobility scenarios in a mobile network with different types of access technology. FIGS. 1 and 2 both relate to a scenario in which the mobile network includes 2G RAT, e.g., GSM RAT, 3G RAT, e.g., WCDMA RAT, and LTE RAT. In FIG. 1, the 2G RAT has a Location Area (LA) and routing area (RA) 200A, see 3GPP TS 23.060, which are separate from the LA and RA 200B of the 3G RAT. The 2G RAT is controlled by a 2G Serving GPRS Support Node (SGSN) 110A, the 3G RAT is controlled by a 3G SGSN 110B, and the LTE RAT is controlled by an LTE Mobility Management Entity (MME) 110C. In FIG. 2, the 2G RAT and the 3G RAT have a combined LA and RA 200A/B and are controlled by a combined 2G/3G SGSN 110A/B. As illustrated by the arrows of FIGS. 1 and 2, a UE may move from 2G/3G RAT to LTE RAT, and vice versa. When moving from 2G/3G RAT to LTE RAT, information concerning an LTE tracking area (TA) 100C, see 3GPP TS 23.401, may be updated by performing a Tracking Area Update (TAU). When moving from LTE RAT to 2G/3G RAT, information concerning the 2G/3G LA/RA may be updated by performing a Location Area Update (LAU) or Routing Area Update (TAU).

To reduce the signaling when moving back and forth between 2G/3G radio access networks (RANs) and LTE RANs in idle mode, a mechanism has been implemented which is referred to as Idle Mode Signaling Reduction (ISR), see 3GPP TS 23.401. ISR is mandatory in the terminals and optional for the network. ISR requires an S4-SGSN, i.e., an SGSN with an S4 interface towards the MME. If the underlying 2G/3G network has separate LA/RA for 2G and 3G, ISR is presently only possible between either LTE and 2G or between LTE and 3G, not both at the same time. If the underlying 2G/3G network has combined LA/RA for 2G and 3G then ISR is possible between LTE and 2G/3G. Here, it is to be noted that with combined 2G/3G RAU/LAU it is unknown whether the UE is in GSM or WCDMA/HSPA coverage.

When performing idle mode mobility between LTE and 2G/3G in case ISR is active, a user equipment (UE) will typically not perform TAU, RAU or LAU, and the UE will not perform IMS (re-)registration. In case ISR is not active, the UE will not perform IMS (re-)registration. When performing idle mode mobility between HSPA and GSM in case of combined RA/LA, the UE might not perform RAU or LAU. It is presently known that the UE performs LAU when the received LAI (Location Area Identifier) is different from the stored LAI, when LAU is needed for a periodic location update, see 3GPP TS 24.008, when VoLGA is used, or when the MSC (Mobile Switching Center) serving the 2G/3G target cell is different from the MSC that served the UE while camping on E-UTRAN, see 3GPP TS 23.272. If neither CS fallback nor VoLGA is being used, the LTE coverage is a "coverage hole" from a CS perspective, i.e. there is generally no location update performed when a UE returns from LTE to CS. If the UE has been CS attached before entering LTE, then the UE will perform LAU when re-entering UTRAN or GERAN coverage only if the LAI has changed or the periodic LAU timer has expired. If the UE has not been CS attached before entering LTE, then the UE will perform LAU when entering UTRAN or GERAN coverage.

The table of FIG. 3 gives an overview on possible terminating call cases for a UE moving between LTE and CS: Here, it is to be noted that corresponding call cases exist if the UE moves between HSPA and CS. In the mobile network, a server termed as Service Centralization and Continuity Application Server (SCC AS), defined in 3GPP TS 23.292 and TS 23.237, decides whether to terminate a call in CS or in PS using LTE or HSPA. In this respect, termination of a call session, or connection refers to the process of supplementing an incoming call, session or connection to the UE by an access leg from the mobile network to the UE, which can be accomplished using PS access or using CS access. In 3GPP TS 23.237 and 23.292, this process is also referred to as Terminating Access Domain Selection (T-ADS). In the table of FIG. 3, "MSC-S registered" means that the MSC-S (MSC Server) is enhanced for ICS and registers the user in IMS.

In the following, termination scenarios in case of idle mode mobility will be further explained. In general, the T-ADS schemes cause the SCC AS to keep track of IMS registrations and the last used domain, which includes the case of an ongoing call. Hence, the following termination scenarios are possible: If the UE is only IMS registered for audio via LTE/HSPA, and UE has used LTE/HSPA for the last call, the SCC AS decides to terminate the call via LTE/HSPA. If the UE is only IMS registered for audio via LTE/HSPA and CS was used for the last call, the SCC AS decides to terminate the call via CS. This may happen after SRVCC when the UE is still IMS registered for audio but the MSC-S has transferred the last call to CS and a terminating call is coming in. If the UE is only IMS registered for audio by the MSC-S, the SCC AS decides to terminate the call via the MSC-S. If the UE registered for audio both via LTE/HSPA and via the MSC-S, the SCC AS decides to terminate the call via the last used domain, the domain last registered in, or according to user or operator preference. If there is no IMS registration of the UE, the SCC AS decides to deliver the terminating call via the MSC-S not enhanced for ICS ("break-out to CS domain"). Accordingly, the SCC AS will try first to terminate the call via the last-used domain. In case of termination over PS while the UE is camping on GERAN/UTRAN, either T-ADS by the UE is used or an error case is reported to the SCC AS. If there is no response, a timer expires, or an error case is reported, e.g., as mentioned above, the SCC AS tries the other domain.

Moreover, the idle mode mobility between LTE/HSPA and 2G/3G generally means that, if the UE is attached in CS and has performed IMS registration over LTE/HSPA, it may in addition be registered by the MSC-S. Further, it is to be noted that an IMS capable UE can be registered in the IMS also when using a GERAN or UTRAN access.

In order to allow for efficient termination of sessions, 3GPP TS 23.292, 23.401, 23.060, and 23.221 specify procedures of network assisted T-ADS in which additional information may be provided to the SCC AS. In particular, when performing attach or TAU/RAU, the MME/SGSN may provide an "IMS voice over PS session supported" indication to the UE. The "IMS voice over PS session supported indication" provides information on whether IMS voice over PS session is supported in the given TA list or RA list. Upon request from a Home Subscriber Server (HSS), the MME/SGSN may also provide this indication to the HSS, from where it can be queried by the SCC AS when performing T-ADS.

After the MME/SGSN has provided the "IMS voice over PS session supported" indication to the HSS, it may however happen that the UE moves to another RAT, and the indication may be no longer valid for this other RAT. For example, the UE could move from E-UTRAN to UTRAN/GERAN, so that an indication of support of IMS voice over PS session may become invalid. Further, the UE may move from UTRAN/GERAN to E-UTRAN, and an indication of no support of IMS voice over PS session may become invalid. That is to say, the HSS may provide an indication to the HSS which at the point of time of providing the indication is no longer correct. Similar situations may occur when the UE moves from one coverage area that supports IMS voice over PS session to one that does not support IMS voice over PS session in the same RAT. In the latter case, the RA or TA would change as well. In each case a situation may occur in which the indication provided by the HSS is outdated before the T-ADS process has finished. This in turn may result in failing T-ADS procedures and undesirable delays.

Accordingly, there is a need for techniques which allow for efficiently handling information on an access capability which may be subject to dynamic changes.

SUMMARY

According to an embodiment of the invention, a method of controlling communication of a UE in a mobile network with a plurality of access networks is provided. According to the method, a control node, which is controlling access of the UE to that one of the access networks which is currently used by the UE, performs a determination of an access capability of the UE in this access network. The control node provides an indication of the determined access capability to a subscriber database associated with the UE. When transmitting the indication, a guard timer is started. After determining the access capability, the control node receives an update indication for the UE. In response to receiving the update indication, the control node performs a redetermination of the access capability. Further, the control node checks if the guard timer has expired and, only if the guard timer has not expired, provides a further indication of the redetermined access capability to the subscriber database.

According to a further embodiment of the invention, a method of controlling communication of a UE in a mobile network with a plurality of access networks is provided. According to the method, an indication of an access capability of the UE in that one of the access networks which is currently used by the UE is received in a subscriber database associated with the UE. The indication is transmitted from the subscriber database to a server configured to control termination of connections to the UE. When transmitting the indication, a guard timer is started. In addition, a further indication of the access capability is received in the subscriber database. It is checked if the guard timer has expired, and only if the guard timer has not expired, the further indication is transmitted from the subscriber database to the server.

According to a further embodiment of the invention, a method of controlling communication of a UE in a mobile network with a plurality of access networks is provided. According to the method, an indication of an access capability of the UE in that one of the access networks which is currently used by the UE is received from a subscriber database associated with the UE. On the basis of the received indication, termination of a connection to the UE is controlled. In addition, a further indication of the access capability of the UE is received from the subscriber database. Based on the further indication, a check is performed if said controlling termination of the connection to the UE requires modification.

According to a further embodiment of the invention, a control node to be used in a mobile network with a plurality of access networks is provided. The control node is configured to control access of a UE to that one of the access networks which is currently used by the UE. Further, the control node is configured to perform a determination of an access capability of the UE in the access network and to provide an indication of the determined access capability to a subscriber database associated with the UE. Further, the control node is configured to start a guard timer when transmitting the indication. In addition, the control node is configured to, after determining the access capability, receive an update indication for the UE and, in response to receiving the update indication, perform a redetermination of the access capability. Further, the control node is configured to check if the guard timer has expired, only if the guard timer has not expired, provide a further indication of the redetermined access capability to the subscriber database. The above functionalities may be controlled by a processor of the control node.

According to a further embodiment of the invention, a subscriber database to be used in a mobile network with a plurality of access networks is provided. The subscriber database is associated with a UE. The subscriber database is configured to receive an indication of an access capability of the UE in that one of the access networks which is currently used by the UE and to transmit the indication from the subscriber database to a server configured to control termination of connections to the UE. Further, the subscriber database is configured to start a guard timer when transmitting the indication. In addition, the subscriber database is configured to receive a further indication of the access capability, check if the guard timer has expired, and only if the guard timer has not expired, transmit the further indication from to the server configured to control termination of connections to the UE. The above functionalities may be controlled by a processor of the subscriber database.

According to a further embodiment of the invention, a server to be used in a mobile network with a plurality of access networks is provided. The server is configured to control providing of terminating connections to a UE. Further, the server is configured to receive, from a subscriber database associated with the UE, an indication of an access capability of the UE in that one of the access networks UE which is currently used by the UE, and to control termination of a connection to the UE on the basis of the received indication. In addition, the server is configured to receive, from the subscriber database, a further indication of the access capability and, based on the further indication, perform a check if said controlling termination of the connection to the UE requires modification. The above functionalities may be controlled by a processor of the server.

According to a further embodiment of the invention, a computer program product comprising program code to be executed by a processor of a network device of a mobile network with a plurality of access networks is provided. The network device may implement the above-mentioned control node, subscriber database, or server. By executing the program code, the network device is caused to perform one of the above-mentioned methods.

BRIEF DESCRIPTION OF THE DRAWINGS

FIG. 3 shows a table illustrating possible terminating call cases for a UE moving between an LTE access network and a CS access network.

DETAILED DESCRIPTION OF EMBODIMENTS

In the following, the invention will be explained in more detail by referring to exemplary embodiments and to the accompanying drawings. The illustrated embodiments relate to handling of access capability information in a mobile network, e.g. a mobile network including both LTE access networks and 2G/3G access networks. However, it is to be understood that the concepts as described herein may also be applied in other types of mobile network, e.g., a mobile network providing PS access via HSPA and 2G/3G CS access.

Figure 4:
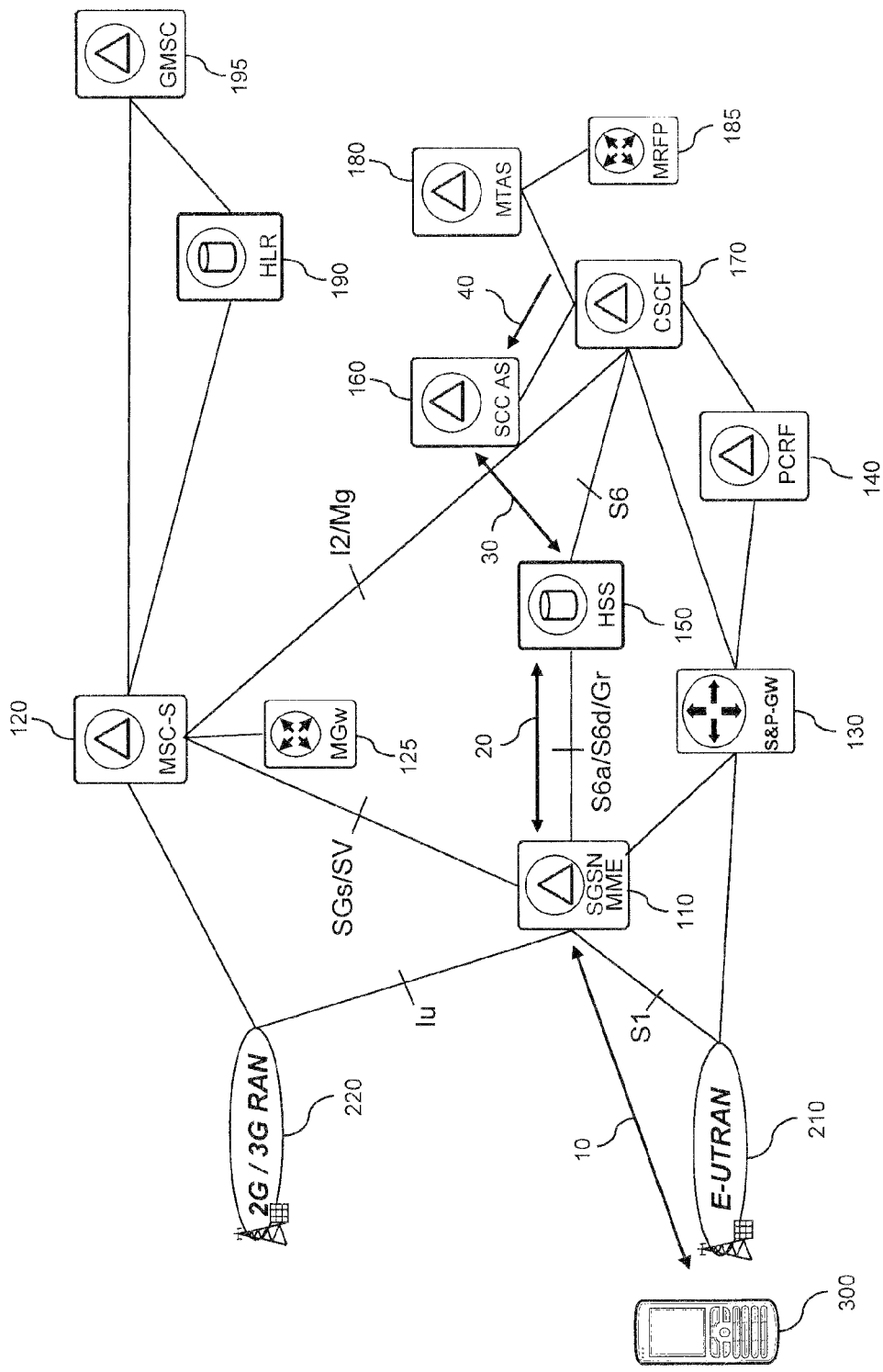
FIG. 4 schematically illustrates a mobile network environment in which concepts according to an embodiment of the invention are implemented.

FIG. 4 schematically illustrates a mobile network environment including LTE access networks and 2G/3G access networks. In FIG. 4, E-UTRAN 210 is shown as an example of the LTE access networks, and 2G/3G RAN 220 as an example of the 2G/3G access networks. The RANs 210, 220 may support different access types, i.e. CS access, PS access, or both. In the illustrated mobile network, the E-UTRAN 210 supports PS access whereas the 2G/3G RAN supports both PS access and CS access. However, the PS access supported by the E-UTRAN 210 and/or in particular by the 2G/3G RAN 220 may in some cases be not suitable to support voice communication, e.g., IMS voice services.

Figure 1:
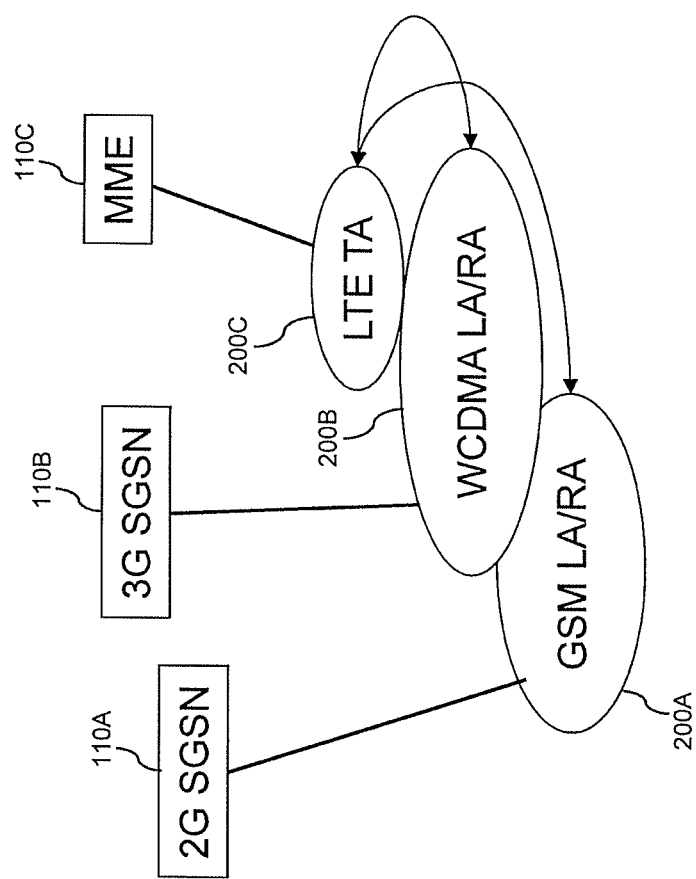
FIG. 1 schematically illustrates mobility in an exemplary mobile network with 2G/3G access technology and LTE access technology.
Figure 2:
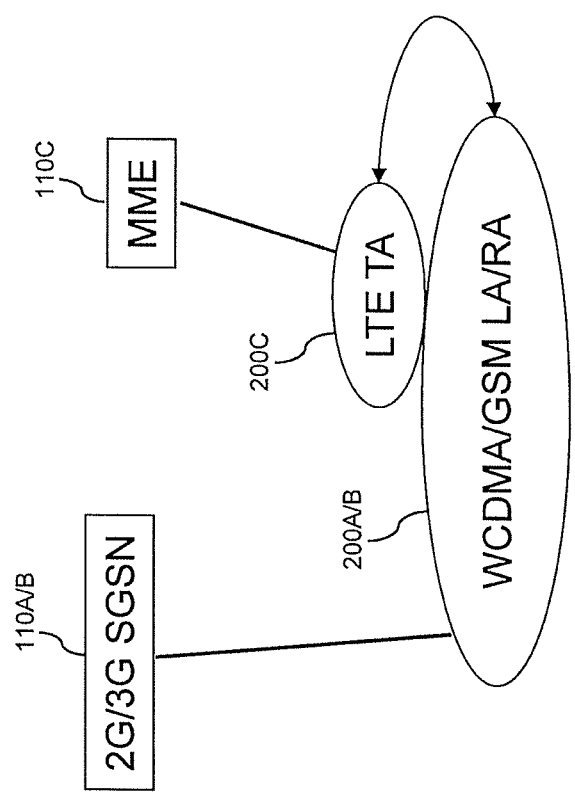
FIG. 2 schematically illustrates mobility in a further exemplary mobile network with 2G/3G access technology and LTE access technology.

The PS access functions of the different RANs 210, 220 are controlled by corresponding control nodes. That is to say, in accordance with the 3GPP TS, the LTE access networks are controlled by one or more control nodes having MME functionality, and the 2G/3G access networks are controlled by one or more control nodes having SGSN functionality. In the following, the control node 110 will therefore also be referred to as SGSN 110, MME 110, or SGSN/MME 110. In FIG. 4, this is illustrated by control node 110. Here, it is to be understood that, for a better overview, only a single control node has been illustrated, which can act as an MME with respect to the E-UTRAN 210 and can act as an SGSN with respect to the 2G/3G RAN. In practice, a plurality of control nodes will be provided in the mobile network, e.g., a plurality of control nodes having MME functionality and a plurality of control nodes having SGSN functionality. Further, separate control nodes having SGSN functionality may be provided for 2G and 3G RANs (see FIG. 1). Also, it is to be understood that each control node typically serves a plurality of RANs. Further functionalities of the control node 110, which are specific to embodiments of the invention, will be described below.

Similarly, the CS access functions of the 2G/3G RAN 220 are controlled by a corresponding control node 120. For example, the control node 120 may implement functionalities of an MSC-S according to the 3GPP TS. In the following, the control node 120 will therefore also be referred to as MSC-S 120. Again, it is to be understood that the mobile network may actually include a plurality of control nodes having MSC-S functionality, and that each of such control nodes may serve a plurality of 2G/3G access networks.

Accordingly, the mobile network of FIG. 4 includes a PS access domain with the E-UTRAN 210, the 2G/3G RAN 220 and the control node 110, and a CS access domain with the 2G/3G RAN 220 and the control node 120.

As illustrated, the PS access domain further includes a gateway node 130, a policy control node 140, a subscriber database 150, a session continuity application server 160, a call session control node 170, and other application servers, e.g., a multimedia application server 180 which may be coupled to a multimedia processing node 185. The gateway node 130 may be implemented as a Serving Gateway (S-GW) or as a Packet Data Network Gateway (PDN GVV) according to the 3GPP TSs. In the following, the gateway node 130 will therefore also be referred to as S-GW 130 or PDN GW 130. The policy control node 140 may be implemented as a Policy and Charging Rules Control Function (PCRF) according to the 3GPP TSs. The call session control node 170 may be implemented as a Call Session Control Function (CSCF) according to the 3GPP TSs, which may include the Proxy-CSCF (P-CSCF) and the Serving-CSCF (S-CSCF) subfunctions. In the following, the call session control node 170 will therefore also be referred to as CSCF 170 or, according to its particular subfunction, as P-CSCF 170 or S-CSCF 170. The multimedia application server 180 may be a Multimedia Telephony Application Server (MTAS) according to 3GPP TS 24.173 and the multimedia processing node may be a Multimedia Resource Function Processor (MRFP) according to 3GPP TS 23.333.

The subscriber database 150 is configured to store subscriber data. For this purpose, the subscriber database 150 is associated with a particular subscriber or the UE 300 used by the subscriber. In other words, the subscriber database 150 is a uniquely defined location for storing data relating to a particular subscriber. The subscriber database 150 may be implemented as a HSS according to 3GPP TSs 23.002 and 23.008. In the following, the subscriber database 150 will therefore also be referred to as HSS 150. Further functionalities of the subscriber database 150, which are specific to embodiments of the invention, will be described below. Unless described otherwise, the session continuity application server 160 may implement functionalities of an SCC AS according to 3GPP TSs 23.237 and 23.292. Functionalities of the session continuity application server 160, which are specific to embodiments of the invention, will be described below.

As illustrated, the CS access domain further includes a media gateway node 125 coupled to the control node 120, a subscriber data register 190, and a gateway control node 190. The media gateway node 125 may be a Media Gateway (MGw) according to 3GPP TS 23.205. The subscriber data register may be a Home Location Register (HLR) according to 3GPP TS. The gateway node 190 may be a Gateway Mobile Switching Center (GMSC) according to the 3GPP TS.

Further, FIG. 4 schematically illustrates a UE 300. The UE 300 may be any type of mobile communication device, e.g., a mobile phone, a portable computer, or the like. It is assumed that the UE 300 is capable of using different types of RAT, in particular the above-mentioned LTE RAT and 2G/3G RAT. Further, it is assumed that the UE 300 is capable of using different access types provided by the access technologies, i.e., PS access and CS access. The capability of using a specific access type may, however, depend on the particular access network the UE 300 is using. For example, voice communication using PS access may be possible in the E-UTRAN 210, but not in the 2G/3G RAN 220. Also, a supported access capability may vary between access networks of the same type. For example, voice communication using PS access may be possible in only some of multiple 2G/3G RANs.

The above devices and nodes are coupled to each other as illustrated in FIG. 4. For this purpose, corresponding interfaces are provided between these nodes. For example, the MME 110 may be coupled to the E-UTRAN 210 using an S1 interface according to the 3GPP TSs. The MME 110 may be coupled to the HSS 150 using a S6a interface according to the 3GPP TSs. The SGSN 110 may be coupled to the 2G/3G RAN using a Iu interface according to the 3GPP TSs. The SGSN 110 may be coupled to the HSS 150 using a S6d interface or a Gr interface according to the 3GPP TSs. The SCC AS 160 may be coupled to the HSS 150 using a Sh interface according to the 3GPP TSs. The SGSN/MME 110 may be coupled to the MSC-S 120 using a SGs or SV interface according to the 3GPP TSs. The MSC-S 120 may be coupled to the CSCF 170 using a I2 or Mg interface according to the 3GPP TSs. Other interfaces may be appropriately selected on the basis of the 3GPP TSs as well.

In order to allow for efficient termination of sessions, concepts as described herein involve providing additional information to the SCC AS 160. More specifically, when performing attach or TAU/RAU, the MME/SGSN 110 may provide an "IMS voice over PS session supported" indication to the UE 300. The "IMS voice over PS session supported indication" provides to the UE 300 the information on whether IMS voice over PS session is supported in the given TA list or RA list. In some cases, the MME/SGSN 110 may provide this indication to the HSS 150 as well. According to an embodiment, these cases are: attaching of the UE to the mobile network, TAU/RAU of the UE to new MME/SGSN 110, and/or TAU/RAU of the UE and the access capability has changed. The HSS 150 may also query the indication from the MME/SGSN 110.

The SCC AS 160 can retrieve, among other information, the indication whether or not IMS voice over PS is supported from the HSS 150 when interrogating for the attach status. The UE 300 can always stay registered in IMS for audio, and the SCC AS 160 can determine whether the currently used access is VoIP capable or not. According to some embodiments, the SCC AS 160 can subscribe to changes of this HSS data. In this way, the SCC AS 160 can be informed automatically when the "IMS voice over PS session supported indication" has changed. If the currently used access is not VoIP capable, then the SCC AS 160 will terminate the session via CS. When assuming that support for IMS voice over PS is given per ISR area, i.e., access capability does not change within one ISR area, the above concepts are also compatible with ISR.

In the following, an implementation of the above concepts will be described in more detail by referring to the signaling indicated in FIG. 4.

As indicated at 10, the UE 300 performs attach or TAU/RAU, and the MME/SGSN 110 provides the "IMS voice over PS session supported" indication to the UE 300. In the case the UE 300 attaches to a non-3GPP network that supports voice, a voice indicator may not be sent to the UE 300. However, in such a case the indicator may be registered by the network, e.g., the Serving or PDN-GW 130.

At 20, MME/SGSN 110 provides this "IMS voice over PS session supported" indication, i.e., the information if the UE is attached to a VoIP capable bearer or not, to the HSS 150. More specifically, this is done in case of: attach, in case of TAU/RAU to new MME/SGSN, and in case of TAU/RAU and the access capability has changed.

At 30, the SCC AS 160 can receive, typically along with other information, the indication whether or not IMS voice over PS is supported from the HSS 150 when interrogating for the attach status. In some embodiments, the SCC AS 160 can subscribe to changes of this HSS data over the Sh interface. In this way, the SCC AS 160 can be informed automatically when the "IMS voice over PS session supported" indication has changed and does not have to interrogate the HSS 150 for every terminating call. However, according to some embodiments, the SCC AS 160 may also request the information on IMS voice support over PS in response to every incoming terminating call.

At 40, a terminating session with speech media arrives for the UE 300. If the subscriber of the UE 300 is registered in the IMS for audio via a PS access and the currently used access is not VoIP capable, the SCC AS 160 will terminate the session via CS. If the subscriber of the UE 300 is registered in the IMS for audio via a PS access and the currently used access is VoIP capable, then the SCC AS will terminate the session via this PS access/contact.

Other terminating cases, e.g., not registered in IMS, only registered via MSC Server, may be handled as specified in 3GPP TS 23.292 and 3GPP TS 23.237.

The above concepts do not require signaling by the UE 300, i.e., are "network only" and are based on some additional signaling so that the MME/SGSN 110 can provide the HSS 150 the "IMS voice over PS session supported indication" and changes of it. The SCC AS 160 can then be informed automatically when the indication is updated. Using a "network only" solution is considered to be advantageous to avoid over that air signaling and battery drain in idle mode. Moreover, providing the information on the VoIP capability in the HSS 150 allows this information to be used not only by the SCC AS 160 but also by other functions in the network if needed.

The above concepts allow that the UE 300 can always stay registered in IMS for audio and the SCC AS 160 can determine whether the currently used access is VoIP capable or not and to use this information to make a correct decision whether to terminate a session on the PS access or to break out to CS. Further, under the assumption that support for IMS voice over PS is given per ISR area, i.e. the access capability does not change within one ISR area, the concepts are also compatible with ISR. Here, an ISR area is an area, including TA and RA, in which ISR can be declared as activated by the SGSN and MME. Further, the concepts may be used to ensure that the HSS 150 contains up-to-date information about access capabilities, e.g. VoIP, SMS and CSFB, which information can then be used by IMS but also by other network functions.

Figure 5:
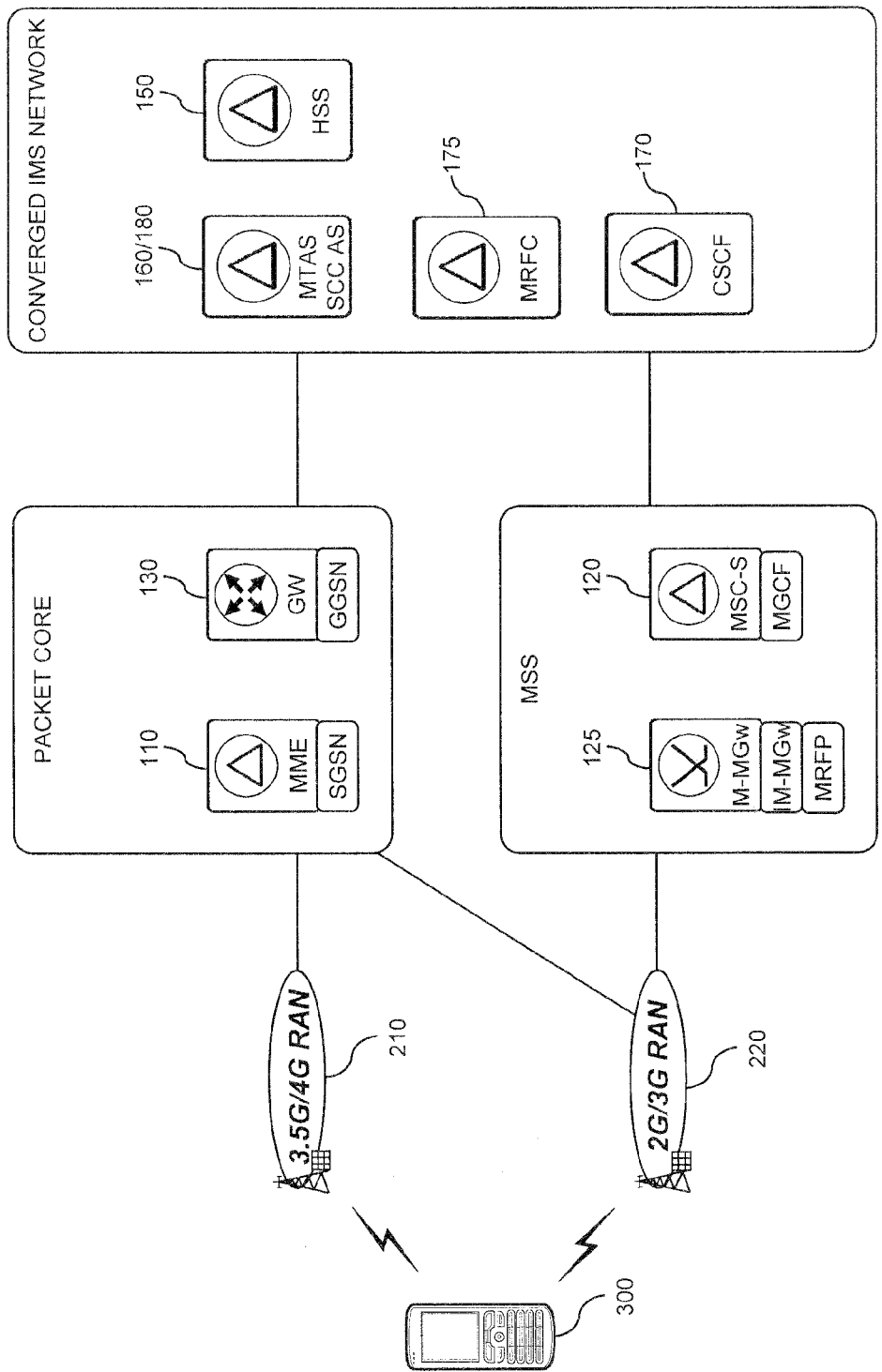
FIG. 5 schematically illustrates a process of terminating a session in accordance with an embodiment of the invention.

FIG. 5 shows an example of T-ADS procedures when assuming that ISR is active. In FIG. 5, a 3.5G/4G RAN 210 and a 2G/3G RAN 220 are illustrated. The 3.5G/4G RAN may for example be an LTE RAN or an UTRAN using HSPA. The 2G/3G RAN 220 may be a GSM RAN or a WCDMA RAN. It should be noted that the 2G/3G RAN 220 shown may represent a plurality of RANs, e.g., a GERAN and a UTRAN.

In the illustrated procedures, if the UE 300 is connected to the 3.5G/4G RAN 210, it may ignore ISR if the support of IMS voice over PS session differs between RAs. If the UE 300 is connected to the 2G/3G RAN 220, it may ignore common RA if the support of IMS voice over PS session differs between RATs.

In the illustrated procedures, the MME/SGSN 110 may indicate homogeneous support of IMS voice over PS session during a location update. If the UE 300 is registered in IMS via PS access, the MTAS/SCC AS 160 may query the current serving node, e.g., the MME/SGSN 110, for the indication of support of IMS voice over PS session and optionally also for the RAT type. This is done via the HSS 150. If needed, the HSS 150 may query the needed information from the MME/SGSN 110. The MME/SGSN 110 responds to the query from the HSS by sending the indication of support of IMS voice over PS session and optionally also the RAT type to the HSS 150. The MME/SGSN 110 may further provide a time stamp of the last radio access by the UE 300 to the HSS 150. The HSS 150 may then aggregate and store the information.

The SCC AS 160 may then use the information provided by the HSS 150, e.g., the indication of support of IMS voice over PS session, RAT type, and/or time stamp, for deciding whether to terminate the session via PS access or via CS access. As mentioned above, the SCC AS 160 may also request the RAT type. In that case the SGSN would also provides the RAT type to the HSS 150, e.g., GERAN or UTRAN. If the current serving node is the MME, which only serves E-UTRAN, there is no need to explicitly check for the RAT type.

When the SGSN/MME 110 was queried by the HSS to provide the indication of support of IMS Voice over PS session and the time stamp of the last radio contact, the UE 300 may however move to another RAT. For example, the UE 300 may moves from E-UTRAN to UTRAN/GERAN, where IMS Voice over PS session should not be used, or the UE 300 may move from UTRAN/GERAN to E-UTRAN, and IMS voice over PS session should be used. The HSS 150 may then provide a result to the SCC AS 160 which at this point in time is no longer correct. The UE 300 could also move from one coverage area that supports IMS voice over PS session to another coverage area in the same RAT that does not support IMS voice over PS session. In the latter case, the RA or TA would change as well. Accordingly, in some scenarios the indication provided by the HSS 150 may be outdated before the SCC AS 160 has finished the process of access domain selection.

Concepts as further explained in the following aim at addressing such scenarios in which an access capability of an UE is subject to dynamic changes.

In general terms, the concepts may be implemented by a method of controlling communication of a UE in a mobile network with a plurality of access networks. According to this method, in a control node which is controlling access of the UE to that one of the access networks which is currently used by the UE, an access capability of the UE in said access network is determined. The control node may for example be the MME/SGSN 110 of FIGS. 4 and 5, and the UE 300 may for example be the UE 300 of FIGS. 4 and 5.

An indication of the determined access capability is provided to a subscriber database associated with the UE and a guard timer is started with the indication, e.g., when sending the indication. The subscriber database may for example be the HSS 150 of FIGS. 4 and 5.

After determining the access capability the control node receives an update indication for the UE, e.g., a RAU or a TAU. The update indication triggers a further determination or redetermination of the access capability of the UE.

The control node checks if the guard timer has expired. Before the timer has expired the control node provides a further indication of the redetermined access capability according to the update indication to the subscriber database associated with the UE. After guard timer expiry no further indication is provided. That is to say, the further indication is only provided if the guard timer has not expired. The sent indication may include a time stamp. Both the sent indication and the update indication may also indicate a RAT type.

In some scenarios, the method may involve a first, also denoted "old", control node and a second, also denoted "new", control node, and the update indication is associated with a handover or move, e.g., in idle mode, of the UE from the first to the second control node. In such cases, the first control node may perform the above steps in response to the update indication received from the second control node. The first control node may redetermine the access capability on the basis of the update indication received from the second control node. Alternatively, the redetermination of the access capability may be performed by the second control node in response to the update indication received from the UE, wherein the further indication of the redetermined access capability is then provided via the first control node to the subscriber database.

The guard timer can consider the time required for access domain selection in case of a terminating call and the initiation of the corresponding signaling, i.e., the time period during which an update of the indication improves the call handling while it can suppress updates in case that the call establishment has progressed too far or failed already.

As mentioned above, such a method may be embodied for example in an MME or an SGSN. For this purpose, the control node may comprise a receiver and a transmitter for the described communications as well as a processing system comprising the guard timer and a control unit for performing the checks and determinations and controlling the provisions of the indications by the transmitter.

Similarly, the concepts may be implemented by a method of controlling communication of a UE in a mobile network with a plurality of access networks, which method may be implemented in a subscriber database and comprises the steps of: receiving, in a subscriber database associated with the UE, an indication of an access capability of the UE in that one of the access networks which is currently used by the UE; transmitting the indication from the subscriber database to a server configured to control termination of connections to the UE and starting a guard timer; receiving, in the subscriber database associated with the UE, a further indication of the access capability of the UE in that one of the access networks which is currently used by the UE; checking if the guard timer has expired; and transmitting the further indication from the subscriber database to a server configured to control termination of connections to the UE if the guard timer has not expired. The control node may for example be the MME/SGSN 110 of FIGS. 4 and 5, and the UE 300 may for example be the UE 300 of FIGS. 4 and 5. The subscriber database may for example be the HSS 150 of FIGS. 4 and 5.

In an embodiment, the subscriber database may indicate to the control node whether it requests to receive the further indication from the control node and/or the value of the guard timer.

The indication and the further indication can be stored in the subscriber database and the further indication will generally replace the preceding indication. If the guard timer has expired the further indication needs not be sent.

For implementing the method, the subscriber database may comprise a receiver and a transmitter for the described communications as well as a processing system comprising the guard timer and a control unit for performing the check and controlling the transmissions. The subscriber database may also comprise also a memory for storing the indications.

Still further, a method of controlling communication of a UE in a mobile network with a plurality of access networks may be provided which may be implemented by an application server and comprises: receiving, from a subscriber database associated with the UE, an indication of a first access capability of the UE in that one of the access networks which is currently used by the UE; on the basis of the received indication, controlling termination of a connection to the UE; receiving, from the subscriber database, a further indication of the access capability of the UE, e.g., in a further one of the access networks which is currently used by the UE; and performing a check if the controlling termination of a connection to the UE requires a modification based on the further indication. A modification may for example be required if the type of the further access network leads to a different result for the question whether IMS voice over PS should be used.

Several options exist for such a modification. If the step of controlling has not yet started when the further indication is received the controlling may be initiated directly according to the further indication. Else the modification may be initiated directly or upon receipt of a failure indication received for the connection.

For implementing the method, the application server may comprise a receiver and a transmitter for the described communications including the controlling of the termination as well as a processing system comprising a control unit for performing the check and initiating the controlling using the transmitter.

In the following, embodiments of the invention will be described more specifically in the context of 3GPP systems, e.g., as illustrated in FIGS. 4 and 5. However, it should be noted that the invention is not limited to such systems.

In an embodiment, the above concepts may be used to enable the SGSN/MME 110 to provide updated information to the HSS 150 and if needed also to the SCC AS 160 in case the UE 300 has moved between two RATs, RAs, or TA lists after the MME/SGSN 110 has been queried for the indication of support of IMS Voice over PS session, optionally together with a time stamp indicating the time of the last radio contact of the UE 300. The case of changing RA/TA list covers the cases that the new RA or TA list is served by the same SGSN/MME 110 or by a different SGSN/MME. In the later case the old SGSN/MME 110 may be informed by new SGSN/MME 110 that the UE 300 has moved. Also the RAT type might have been be queried and may have changed.

When assuming that the UE 300 performs RAU/TAU when moving between a RAT which supports IMS voice over PS session and a RAT which does not support IMS voice over PS session, the UE 300 may ignore ISR if it is active, e.g., as specified in 3GPP TS 23.401 and 23.060. The UE 300 can also perform RAU/TAU when moving to new RA or TA list, in particular when it moves from a RA/TA that is indicated in a RA/TA list to support IMS voice over PS session to a RA/TA that is indicated in a RA/TA list to not support IMS voice over PS session or vice versa.

If a control node like the MME/SGSN 110 was requested to provide the indication of support IMS over PS session to as subscriber database like the HSS 150, then the control node starts a first guard timer, in the following also denoted as timer T1. The value of the timer T1 as used by the control node may be received from HSS 150 or configured in the control node.

If there is a TAU/RAU by the UE 300 before the timer T1 expires, then the control node indicates to the HSS 150 that UE 300 has had new radio contact, the new time stamp of radio contact by the UE 300, and the valid indication of support of IMS Voice over PS session. If also the RAT type has been queried before and if a RAU has been performed, the control node also provides the RAT type to the HSS 150. This may in particular be used if the control node serves multiple RAT types, such as a SGSN.

If, before the timer T1 expires, the control node is informed by a new control node, which may be an MME/SGSN, that the UE 300 has moved to a new RA/TA then the new control node includes the indication of support of IMS Voice over PS session and the time stamp, optionally also the RAT type, into the signaling with the old control node. The old control node indicates to the HSS 150 that UE has had new radio contact, the new time stamp of radio contact by the UE 300 and the valid indication of support of IMS Voice over PS session. If also the RAT type has been queried before and if a RAU has been performed, the old control node also provides the RAT type to the HSS 150. This may in particular be used if the new control node serves multiple RAT types, such as a SGSN.

It is also possible that the old control node informs the new control node about that the indication of support of IMS voice over PS session was just, e.g., before expiry of the timer T1, requested and that the new control node should provide the update to the HSS.

The subscriber database, e.g., the HSS 150, may indicate whether it is interested to receive status update information from the control node within a given timeframe corresponding to the duration of the timer T1, e.g., by sending a corresponding request to the control node. This request may include the duration of the timer T1.

When receiving the indication about new radio contact from the control node, the HSS 150 may, if not having yet responded to the SCC AS 160, use the new indication of support of IMS Voice over PS session, the corresponding time stamp, and optionally the indicated RAT type for determining the response to the SCC AS 160. If the HSS 150 already responded to the SCC AS 160 and if a second guard timer, in the following also denoted as timer T2, started when responding to the SCC AS 160, has not yet expired, and if the new answer with the indication of support of IMS Voice over PS session would deviate from the old answer, the HSS 150 may send a new answer to the HSS 150. Sending the new answer may for example be accomplished using a push message over the Sh interface between the HSS 150 and the SCC AS 160, also referred to as Sh push. If requested by the SCC AS 160, the new answer may also include the RAT type.

If the SCC AS 160 receives the new answer, including the indication of support of IMS Voice over PS session and optionally the RAT type, from the HSS 150 and the T-ADS decision is not yet finished, then it will use the new answer for finishing the T-ADS decision. If the SCC AS 160 already finished the T-ADS decision and forwarded the terminating call, i.e., performed control signaling for controlling the termination of the connection to the UE 300, the SCC AS 160 may directly start a new terminating call attempt to new terminating domain. This may also involve handling the termination failure over old domain. Alternatively, the SCC AS 160 may wait for a termination failure and route the call then to new terminating domain.

The durations of the timers T1 and T2, i.e., the values for expiry of the guard timers, may be adjusted to each other and may be chosen on the basis of a time required for performing the T-ADS decision and call forwarding, e.g., according to an average or maximum time required for this procedure. In particular, the durations of the timers T1 and T2 may be set to be shorter than such average or maximum time, thereby allowing to efficiently signal updated information as long as it is still useful for the ongoing T-ADS process while avoiding unnecessary signaling of information.

Figure 6:
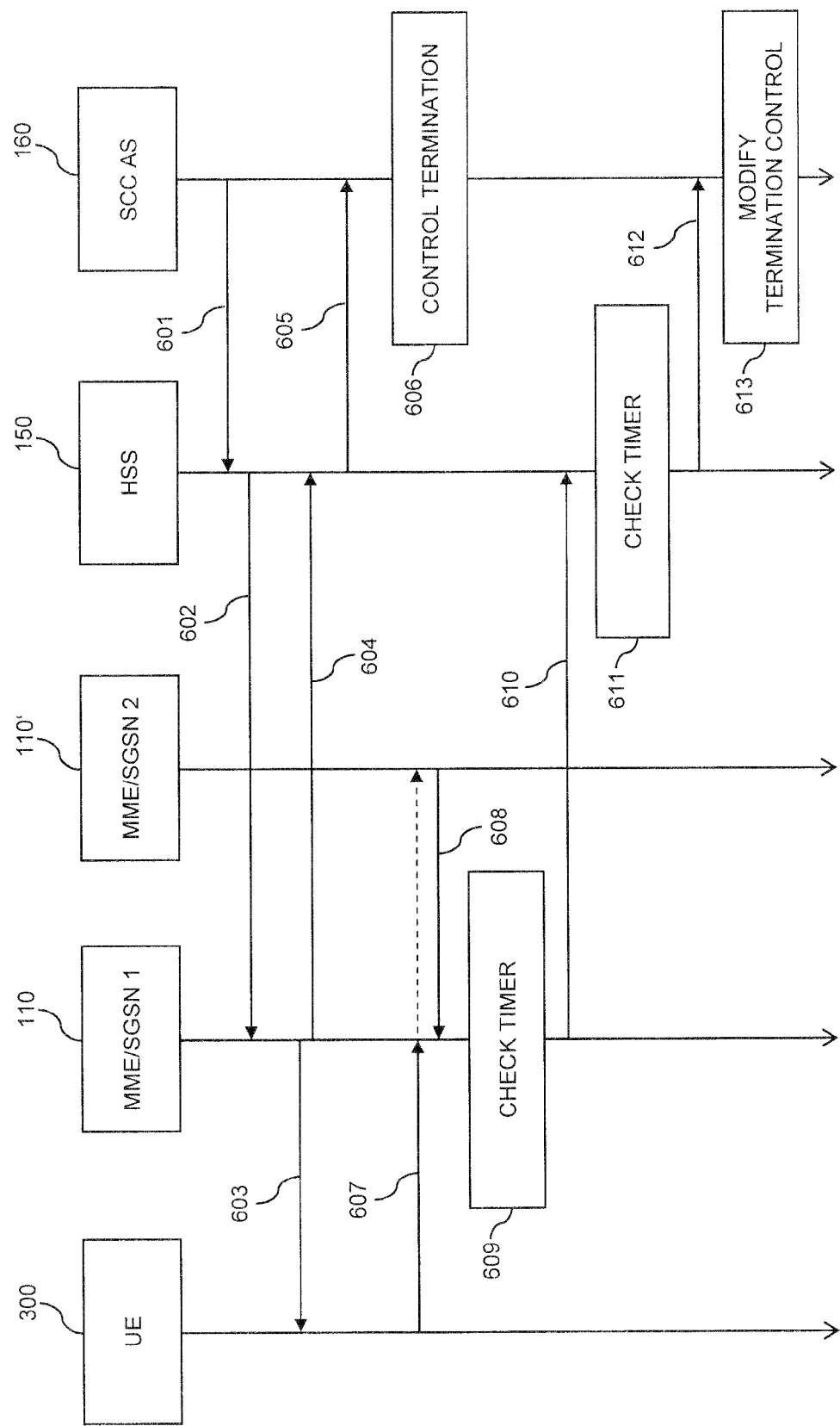
FIG. 6 shows a signaling diagram for illustrating exemplary procedures according to an embodiment of the invention.

A signaling diagram illustrating an example of procedures using the above concepts is illustrated in FIG. 6. The procedures of FIG. 6, involve the UE 300, the control node 110 (illustrated as MME/SGSN 1), a further control node 110' (illustrated as MME/SGSN 2), the HSS 150, and the SCC AS 160.

Initially, the SCC AS 160 may request information from the HSS 150 by sending message 601 to the HSS 150. In particular, the SCC AS 160 may request an indication whether IMS voice over PS session is supported or not in the access network currently used by the UE 300. The SCC AS 160 may also request to be provided with updates of the indication whether IMS voice over PS session is supported or not. The SCC AS 160 may also request information on a RAT type currently used by the UE 300.

The HSS 150 may in turn send message 602 to the control node 110 to request information from the control node 110. In particular, the HSS 150 may request the indication whether IMS voice over PS session is supported or not. The HSS 150 may also request to be provided with updates of the indication whether IMS voice over PS session is supported or not. The HSS 150 may also request information on the RAT type currently used by the UE 300. Together with the request of message 602, the HSS 150 may also indicate a time interval in which an update of the indication whether IMS voice over PS session is supported or not is to be provided by the control node.

By message 603 the control node 110 indicates support of IMS voice over PS session to the UE 300. In particular, the message 603 includes the indication whether IMS voice over PS session is supported or not. Sending the message 603 may for example be accomplished during a location update of the UE 300 or when the UE 300 attaches to the mobile network.

By message 604, the control node 110 also sends the indication to the HSS 150 where it is stored. When sending the message 604, the control node 110 also starts the first guard timer. The duration of the first guard timer may correspond to the time interval which may be indicated by the HSS 150 in message 602.

By message 605, the HSS 150 forwards the indication to the SCC AS 160 to be used for controlling termination of a call, as illustrated by step 606. The HSS 150 may send the message 605 for example in response to a request from the SCC AS 160, e.g., the request in message 601. When sending the message 605, the HSS 150 also starts the second guard timer.

As further illustrated, the control node 110 may receive an update indication. The update indication may for example be received in a message 607 from the UE 100. For example the message 607 could be a RAU or a TAU. Alternatively, the update indication could also be received from the further control node 110', as illustrated by message 608. For example, the UE 300 could have moved from the responsibility of the control node 110 to the responsibility of the further control node 110', i.e., the control node 110 may be the old control node and the further control node 110' may be the new control node for the UE 300. As illustrated by the dashed arrow, the UE 300 could then send the message 607 to the further control node 110'. The further control node 110' may indicate in message 608 to the control node 110 whether IMS voice over PS session is supported or not for the access network now used by the UE 300.

As illustrated by step 609, the control node 110 may then check whether the first guard timer has expired. Only if the first guard timer has not expired, the control node 110 sends message 610 to provide the updated indication whether IMS voice over PS session is supported or not to the HSS 150.

As illustrated by step 611, the HSS 150 may then check whether the second guard timer has expired. Only if the second guard timer has not expired, the HSS 150 sends message 612 to provide the updated indication whether IMS voice over PS session is supported or not to the SCC AS 160.

As illustrated by step 613, the SCC AS 160 may then use the updated indication to check whether the process of termination of the call needs as initiated at step 606 requires modification, e.g., by selecting another terminating access domain.

The above-described mechanism provides the indication to the HSS 150 whether the access supports IMS voice over PS session. However, the mechanism may be used with respect to other access capabilities as well.

Figure 7:
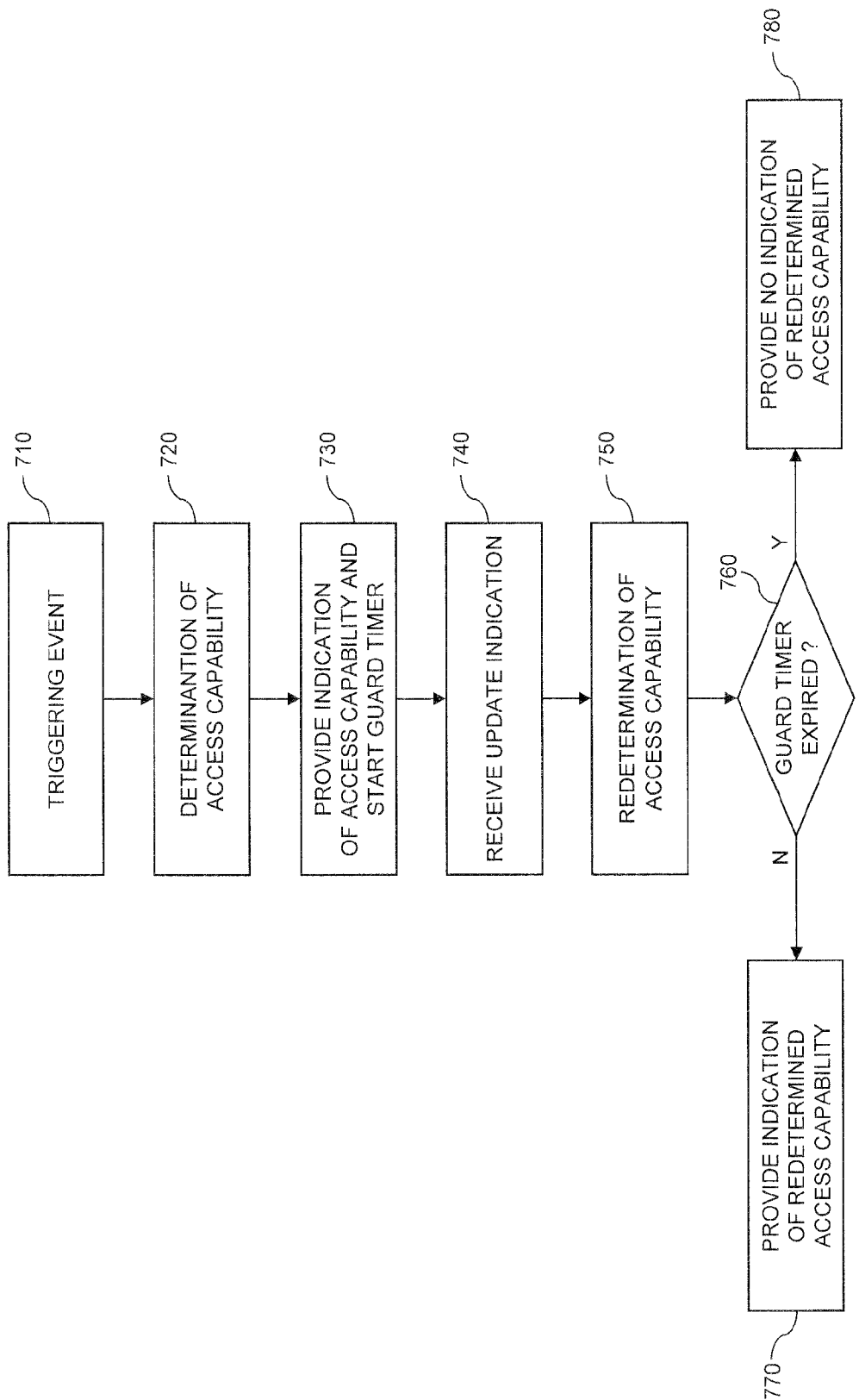
FIG. 7 shows a flowchart for illustrating a method according to an embodiment of the invention.

FIG. 7 shows a flowchart illustrating a method according to an embodiment of the invention. The method may be used in a mobile network with multiple access networks, e.g., in the mobile network as illustrated in FIG. 4, for controlling communication of a UE, e.g. the UE 300. More specifically, the method may be used for handling of access capability information in the control node 110 of FIGS. 4, 5, and 6.

Step 710 illustrates an optional triggering event. The triggering event may be the UE attaching to the mobile network, the UE moving from another access network to the currently used access network, and/or a change of access capability.

At step 720, the control node determines an access capability of the UE in that one of the access networks which is currently used by the UE. Here, it is to be understood that the UE may also be in an idle mode, e.g., not be engaged in a call. The access capability may comprise whether voice communication over PS access, in particular IMS voice over PS session, is supported or not, i.e., the access capability may comprise support of voice communication over PS access, in particular support of IMS voice over PS session. From a perspective of the UE, the access capability may vary, e.g., if the UE moves from one of the access networks to another one of the access networks, e.g., to an access network using different access technology.

At step 730, the control node provides an indication of the determined access capability to a subscriber database, e.g., to the HSS 150. The indication may be provided in response to an event, e.g., in response to the UE attaching to the mobile network, in response to the UE moving from another access network to the currently used access network, and/or in response to the access a capability having changed. For this purpose, the UE may perform LAU, RAU, or TAU. The event may also trigger the determination of the access capability, e.g., as indicated by the optional triggering event 710. The indication to the subscriber database may include a time stamp, e.g., a time stamp representing a time of the last radio contact between the UE and the mobile network. The indication to the subscriber database may also indicate a RAT of the currently used access network. When sending the indication to the subscriber database, the control node starts a first guard timer, e.g., the above-mentioned timer T1.

The information with respect to the access capability may then be stored in the subscriber database so as to be used by other network devices or functions. In particular, the information may be used for controlling the termination of sessions.

At step 740, the control node receives an update indication. The update indication may be a RAU or a TAU. The update indication may also be associated with a move of the UE from the control node to a further control node, e.g., as part of a handover procedure in connected mode or of an idle mode mobility procedure. In such scenarios, the control node may receive the update indication from the further control node. Alternatively, the control node may receive the update indication from the UE.

At step 750, the control node performs a further determination, i.e., a redetermination, of the access capability. In this way, an updated value of the access capability is obtained which is valid after an event associated with the update indication of step 740. The redetermination may be performed in a similar way as the determination of step 720. In some scenarios, if the update indication is received from a further control node now controlling access of the UE to another one of the access networks, the redetermination may be performed on the basis of information in the update indication. For example, the update indication could include the indication of the access capability, and optionally the RAT type, as determined by the further control node.

At step 760, the control node checks whether the first guard timer has expired. If this is not the case, the method continues with step 770, as indicated by branch "N".

At step 770, the control node provides a further indication of the redetermined access capability, as obtained at step 760, to the subscriber database. If the update indication of step 740 is associated with a move of the UE from the control node to a further control node, the further control node may provide the further indication of the access capability to the control node, e.g., in the update indication of step 740, and the control node may then provide it to the subscriber database. This may be accomplished in response to the further control node receiving a RAU or TAU from the UE. The further indication to the subscriber database may include a time stamp, e.g., a time stamp representing a time of the last radio contact between the UE and the mobile network. The further indication to the subscriber database may also indicate a RAT of the currently used access network. The information concerning the redetermined access capability may be used for modifying an ongoing process of terminating a session, e.g., by selecting another terminating access domain.

If the check of step 760 reveals that the first guard timer has expired, the method continues with step 780, as indicated by branch "Y".

At step 780 the control node provides no indication of the redetermined access capability to the subscriber database. In this way, unnecessary signaling of the access capability can be avoided, e.g., in cases where a process of terminating a session on the basis of the indication of step 730 can be assumed to have already finished.

Figure 8:
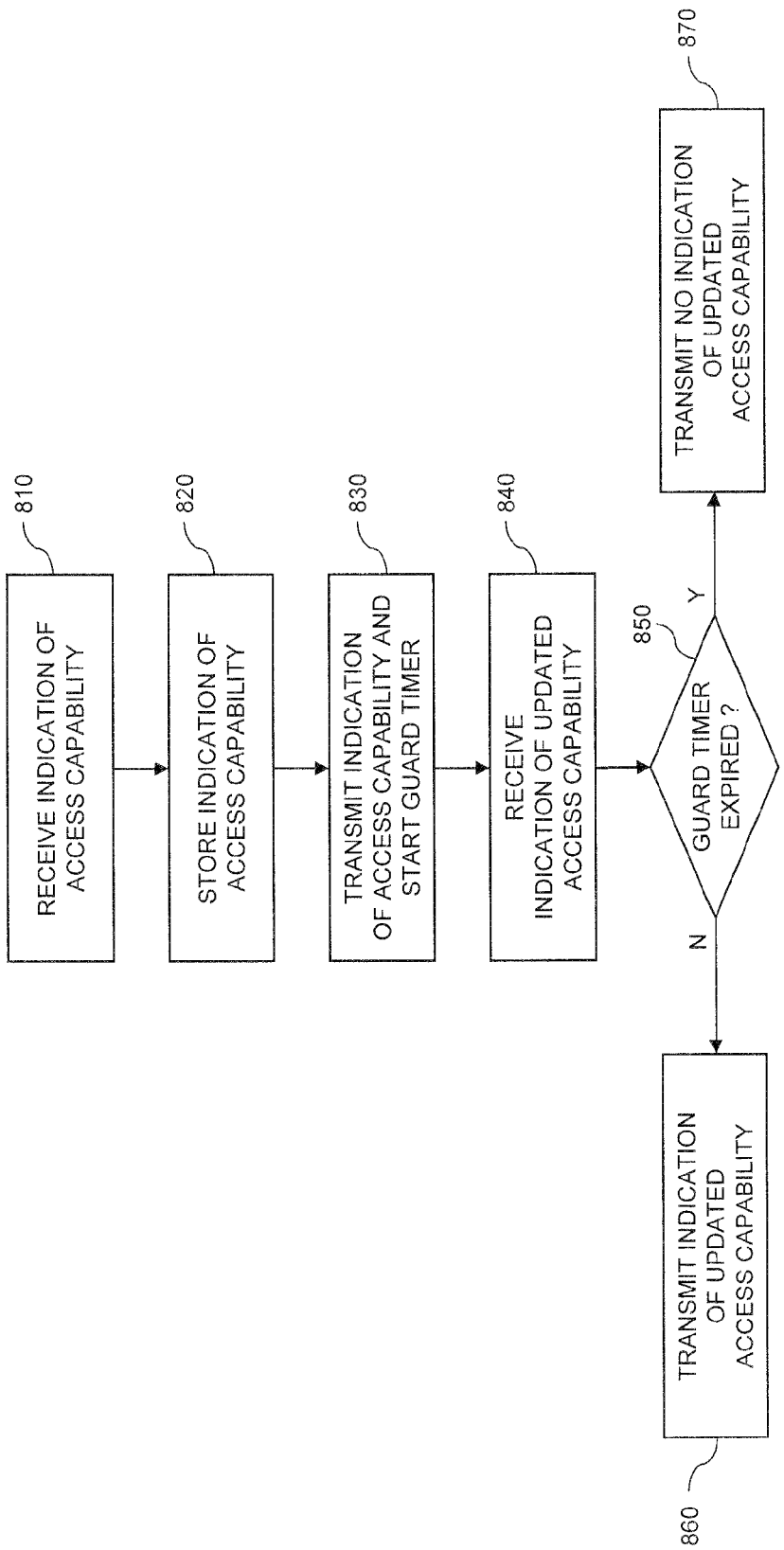
FIG. 8 shows a flowchart for illustrating a further method according to an embodiment of the invention.

FIG. 8 shows a flowchart illustrating a further method according to an embodiment of the invention. The method may be used in a mobile network with multiple access networks, e.g., in the mobile network as illustrated in FIG. 4, for controlling communication of a UE, e.g., the UE 300. More specifically, the method may be used for handling of access capability information in the subscriber database 150 of FIGS. 4, 5, and 6.

At step 810, the subscriber database, which is associated with the UE, receives an indication of an access capability of the UE in that one of the access networks which is currently used by the UE. The indication may be received from a control node controlling access of the UE to this access network, e.g. the control node 110 of FIGS. 4, 5, and 6. The access capability may comprise whether voice communication over PS access, in particular IMS voice over PS session, is supported or not, i.e., the access capability may comprise support of voice communication over PS access, in particular support of IMS voice over PS session. The indication may include a time stamp, e.g., a time stamp representing a time of the last radio contact between the UE and the mobile network. The indication may also indicate a RAT of the currently used access network.

The indication of step 810 may be received in response to a request from the subscriber database to the control node. This request may also indicate whether the subscriber database requests to be provided with updates of the access capability and a time interval after the indication of step 810 in which such updates are to be provided. This time interval could be used by the control node to set the duration of the first guard timer in the method of FIG. 7.

At step 820, the indication received at step 810 may be stored in the subscriber database. In particular, the indication may be stored in a data record uniquely related to a subscriber using the UE.

At step 830, the subscriber database transmits the indication to a server configured to control termination of connections to the UE, e.g., to the session SCC AS 160 of FIGS. 4, 5 and 6. The indication may be transmitted in response to a request message from the server, e.g., on an as-needed-basis. Further, the server may also be subscribed to changes of the indicated access capability. That is to say, when the server is subscribed, the subscriber database will automatically transmit the indication to the server in response to changes of the information with respect to the indication as stored in the database. When sending the indication to the server, the subscriber database starts a second guard timer, e.g., the above-mentioned timer T2.

At step 840, the subscriber database receives a further indication of the access capability, i.e., an updated value of the access capability. The further indication may be received from the control node of step 810. In some scenarios, the further indication may also be received from another control node controlling access of the UE to another one of the access networks which is now used by the UE. The further indication may include a time stamp, e.g., a time stamp representing a time of the last radio contact between the UE and the mobile network. The further indication may also indicate a RAT of the currently used access network. The further indication may be stored in the subscriber database, replacing the indication of step 810.

At step 850, the subscriber database checks whether the second guard timer has expired. If this is not the case, the method continues with step 860, as indicated by branch "N".

At step 860, the subscriber database provides a further indication of the updated access capability, as obtained at step 840, to the server. The information concerning the updated access capability may be used by the server for modifying an ongoing process of terminating a session, e.g., by selecting another terminating access domain.

If the check of step 850 reveals that the second guard timer has expired, the method continues with step 870, as indicated by branch "Y".

At step 870 the subscriber database provides no indication of the updated access capability to the server. In this way, unnecessary signaling of the access capability can be avoided, e.g., in cases where a process of terminating a session on the basis of the indication of step 830 can be assumed to have already finished.

Figure 9:
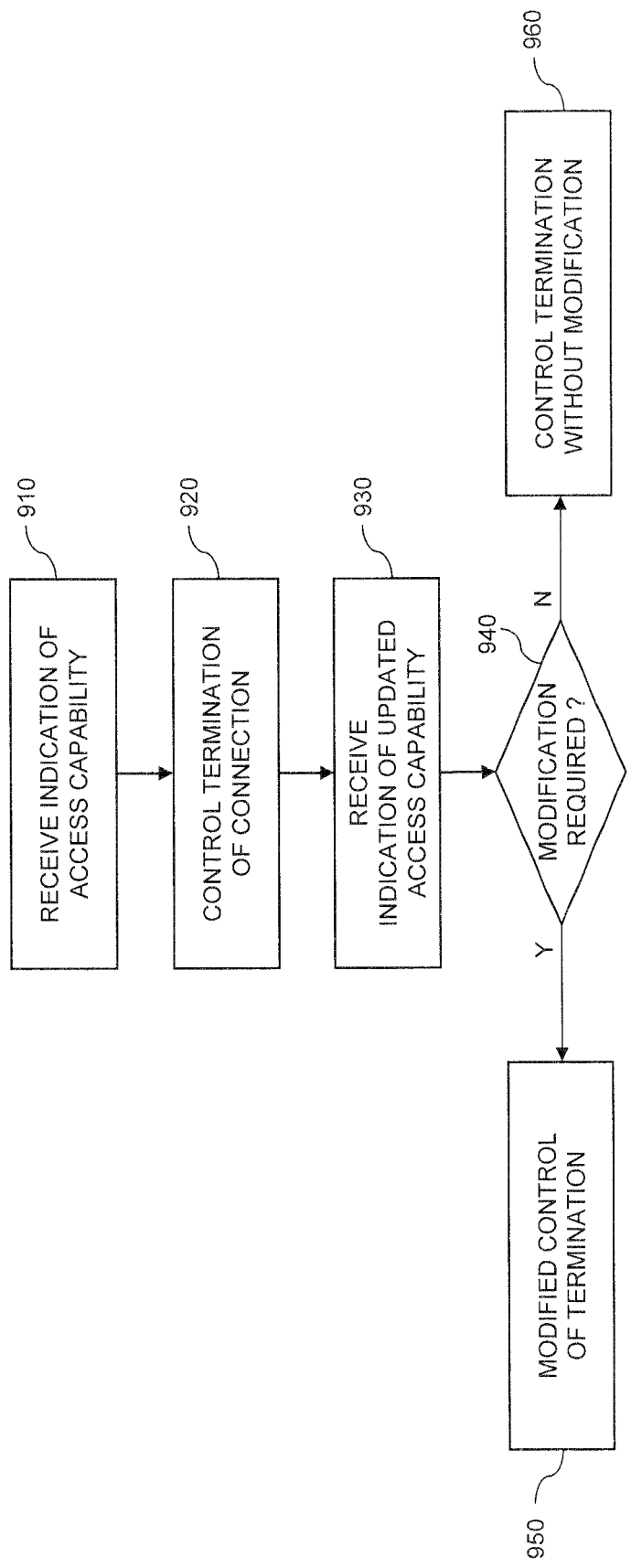
FIG. 9 shows a flowchart for illustrating a further method according to an embodiment of the invention.

FIG. 9 shows a flowchart illustrating a further method according to an embodiment of the invention. The method may be used in a mobile network with multiple access networks, e.g., in the mobile network as illustrated in FIG. 4, for controlling communication of a UE, e.g., the UE 300. More specifically, the method may be used for handling of access capability information in a server configured to control providing of terminating connections to the UE, e.g., in the SCC AS 160 of FIGS. 4, 5, and 6.

At step 910, the server receives from a subscriber database, e.g., the HSS 150 of FIGS. 4, 5, and 6, an indication of an access capability of the UE in that one of the access networks which is currently used by the UE. The indication may be received in response to a request message from the server, e.g., on an as-needed-basis. Further, the server may also be subscribed to changes of the indicated access capability, so as to be automatically informed when the information with respect to the access capability stored in the subscriber database changes. The access capability may comprise whether voice communication over PS access, in particular IMS voice over PS session, is supported or not, i.e., the access capability may comprise support of voice communication over PS access, in particular support of IMS voice over PS session. The indication may include a time stamp, e.g., a time stamp representing a time of the last radio contact between the UE and the mobile network. The indication may also indicate a RAT of the currently used access network.

At step 920, the server controls termination of a connection to the UE on the basis of the received indication. In particular, the server may decide whether to terminate the connection to the UE using PS access, i.e., in the PS access domain, or using CS access, i.e., in the CS access domain. Accordingly, if the received indication indicates support of voice communication over PS access, the server may decide to terminate the connection to the UE using PS access. If the received indication indicates no support of voice communication over PS access, the server may be decide to terminate the connection to the UE using CS access, e.g., by using breakout to the CS access domain.

At step 930, the server receives a further indication of the access capability from the subscriber database, i.e., an updated value of the access capability. The further indication may include a time stamp, e.g., a time stamp representing a time of the last radio contact between the UE and the mobile network. The further indication may also indicate a RAT of the currently used access network.

At step 940, the server decides whether modification of the if the process of controlling termination of the connection to the UE requires modification in view of the further indication received at step 930. If this is the case, the method continues with step 1150, as indicated by branch "Y".

At step 950, the server modifies the control of termination of the connection to the UE. For this purpose, the server may controlling termination of the connection to the UE on the basis of the further indication. For example, if the further indication indicates that voice communication over PS access is supported, the server may decide to terminate the connection using voice communication over PS access. Similarly, if the further indication indicates that voice communication over PS access is not supported, the server may decide to terminate the connection using CS access. The modified control may involve immediately initiating a terminating session on the basis of the further indication. Alternatively, the server may initiate a terminating session on the basis of the further indication once the control process on the basis of the indication of step 920 has failed.

The methods as described in connection with FIGS. 7 to 9 may be combined with each other. In particular, the method of claim 7 may be used to provide the indication and further indication as input to the method of claim 8, and/or the method of claim 8 may be used to provide the indication and the further indication as input to the method of claim 9.

Figure 10:
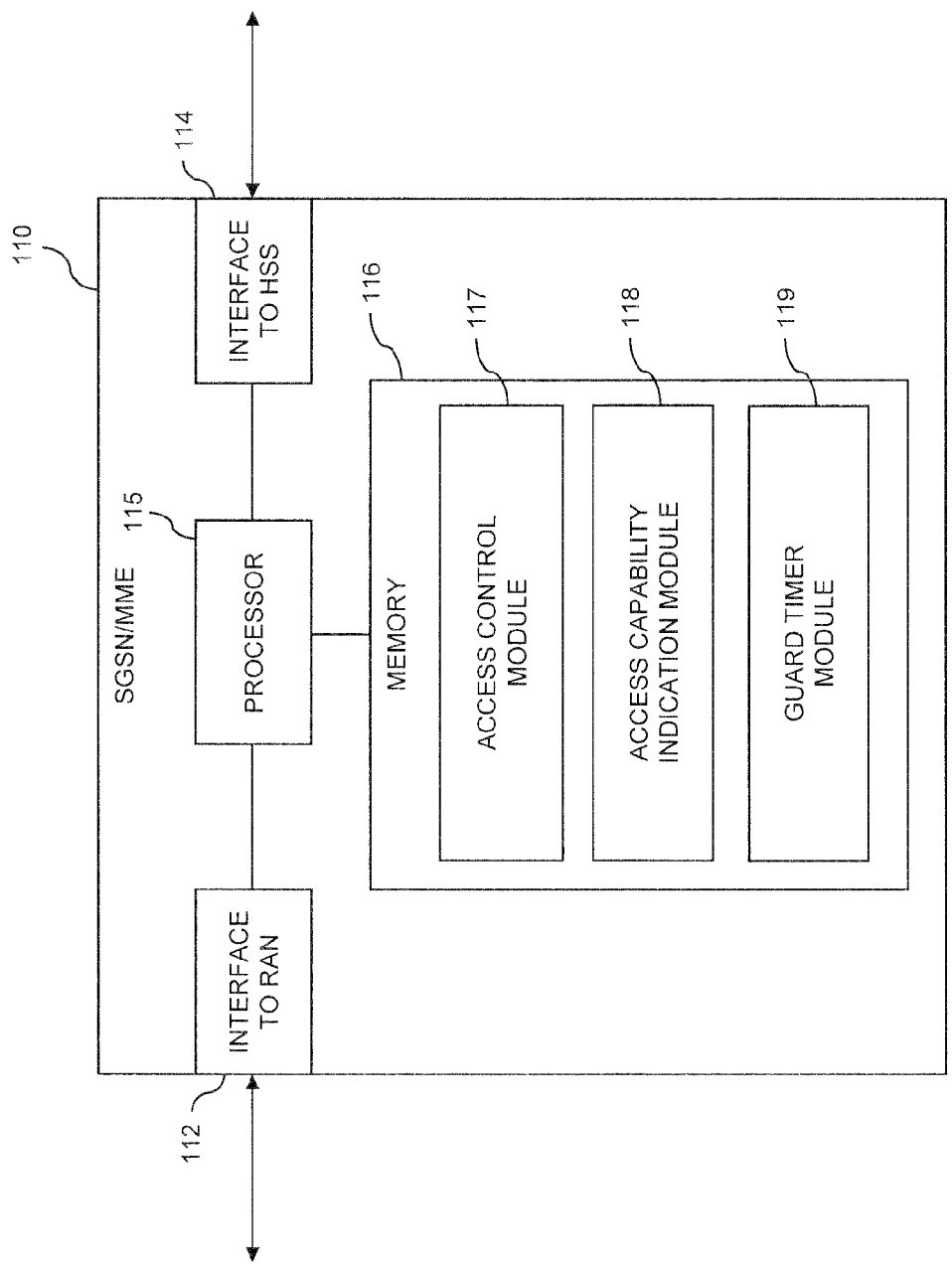
FIG. 10 schematically illustrates a control node according to an embodiment of the invention.

FIG. 10 further illustrates an exemplary implementation of the control node which may be used to implement the above-mentioned concepts. As explained above, the control node may be configured to be operated as an SGSN or MME according to the 3GPP TSs. In particular, the control node may correspond to the control node 110 of FIGS. 4, 5, and 6.

The control node 110 includes a RAN interface 112 to one or more RANs, e.g. the E-UTRAN 210 or the 2G/3G RAN 220. If the control node has SGSN functionality, the RAN interface 112 will be to the 2G/3G RAN 220 and be implemented as a Gb or Iu interface according to the 3GPP TSs. If the control node 160 has MME functionality, the RAN interface 112 will be to the E-UTRAN 210 and be implemented as a S1 interface according to the 3GPP TSs. In addition the control node has an interface 114 to the HSS 150. If the control node 160 has SGSN functionality, the interface 114 may be implemented as a S6d interface or a Gr interface according to the 3GPP TSs. If the control node 160 has MME functionality, the interface 114 may be implemented as a S6a according to the 3GPP TSs. It is to be understood that the interfaces 112 and 114 may be implemented by using one or more suitably configured receivers and transmitters of the control node 110.

Further, the control node 160 includes a processor 115 coupled to the interfaces 112, 114 and a memory 116 coupled to the processor 115. The memory 116 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 116 includes suitably configured program code to be executed by the processor 116 so as to implement the functionalities of the control node 160 as explained above. More specifically, the memory 116 may include an access control module 117 so as to implement access control functionalities, e.g., establishing, modifying or dropping of bearers via a connected RAN, and an access capability indication module 118 so as to implement the above-described functionalities of indicating an access capability and updates thereof to the UE and/or to the HSS. Further, the memory 116 includes a guard timer module 119 so as to implement the above-mentioned first guard timer to be used for selectively providing an updated indication of the access capability.

It is to be understood that the structure as illustrated in FIG. 10 is merely schematic and that the control node 110 may actually include further components which, for the sake of clarity, have not been illustrated, e.g. further interfaces. Also, it is to be understood that the memory 116 may include further types of program code modules, which have not been illustrated, e.g., program code modules for implementing known functionalities of an SGSN or MME according to the 3GPP TSs. Further, it is to be understood that the structures of FIG. 10 are an example of implementing the control node with the above-mentioned receiver, transmitter, processing system, and control unit, but that other implementations of the above-mentioned receiver, transmitter, processing system, and control unit are possible as well.

Figure 11:
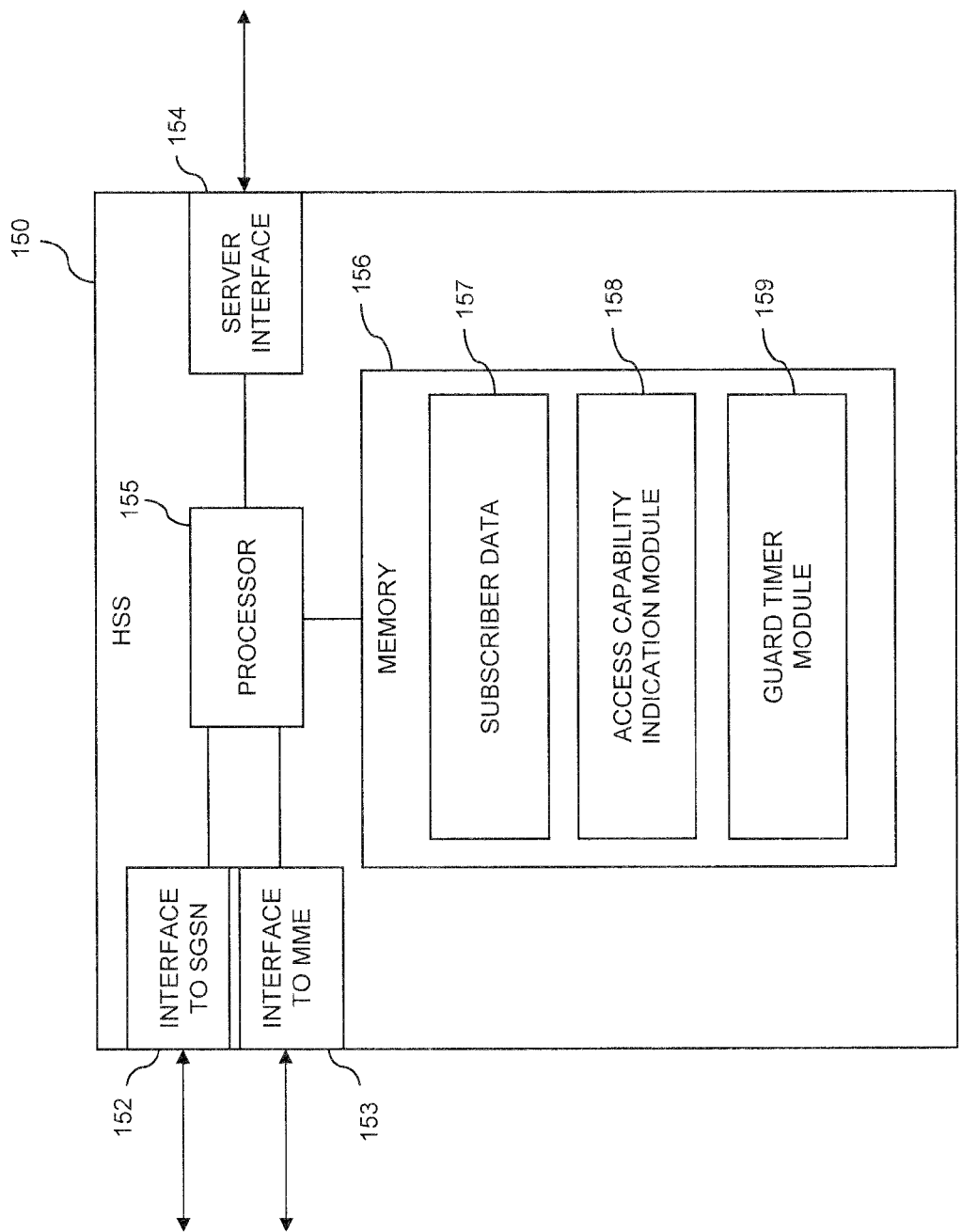
FIG. 11 schematically illustrates a subscriber database according to an embodiment of the invention.

FIG. 11 further illustrates an exemplary implementation of a subscriber database which may be used to implement the above-mentioned concepts. As explained above, the subscriber database may be configured to be operated as an HSS according to the 3GPP TSs. In particular, the subscriber database may correspond to the HSS 150 of FIGS. 4, 5, and 6.

The subscriber database 150 includes a first control node interface 152, which has the purpose of coupling the subscriber database 150 to the SGSN, e.g., implemented by the control node 110, a second control node interface 153, which has the purpose of coupling the subscriber database to the MME, e.g., implemented by the control node 110, and a server interface 154, which has the purpose of coupling the subscriber database 150 to one or more application servers, e.g., the SCC AS 160. The first control node interface 152 may be implemented as a S6d interface or a Gr interface according to the 3GPP TSs. The second control node interface 153 may be implemented as a S6a interface according to the 3GPP TSs. In some embodiments, only one of the first control node interface 152 and the second control node interface 153 may be provided, or these interfaces may be combined in a single interface. The server interface 154 may be a Sh interface according to the 3GPP TSs. It is to be understood that the interfaces 152, 153, and 154 may be implemented by using one or more suitably configured receivers and transmitters of the subscriber database 150.

Further, the subscriber database 150 includes a processor 155 coupled to the interfaces 152, 153, 154 and a memory 156 coupled to the processor 155. The memory 156 may include a ROM, e.g., a flash ROM, a RAM, e.g., a DRAM or SRAM, a mass storage, e.g., a hard disk or solid state disk, or the like. The memory 156 includes data and suitably configured program code to be executed by the processor 156 so as to implement the functionalities of the subscriber database 150 as explained above. More specifically, the memory 156 may include subscriber data 157, in particular the subscriber related information with respect to the access capability indication, and a access capability indication module 158 so as to implement functionalities needed to handle the information with respect to the access capability and updates thereof, e.g., receiving the information from the control node, storing the information, or providing the information and updates thereof to a requesting or subscribed server, e.g., to the SCC AS 160. Further, the memory 156 includes a guard timer module 159 so as to implement the above-mentioned second guard timer to be used for selectively providing an updated indication of the access capability to the requesting or subscribed server.

It is to be understood that the structure as illustrated in FIG. 11 is merely schematic and that the subscriber database 150 may actually include further components which, for the sake of clarity, have not been illustrated. Also, it is to be understood that the memory 156 may include further types of subscriber data and program code modules, which have not been illustrated, e.g., program code modules for implementing known functionalities of a HSS according to the 3GPP TSs. Further, it is to be understood that the structures of FIG. 11 are an example of implementing the subscriber database with the above-mentioned receiver, transmitter, processing system, and control unit, but that other implementations of the above-mentioned receiver, transmitter, processing system, and control unit are possible as well.

Figure 12:
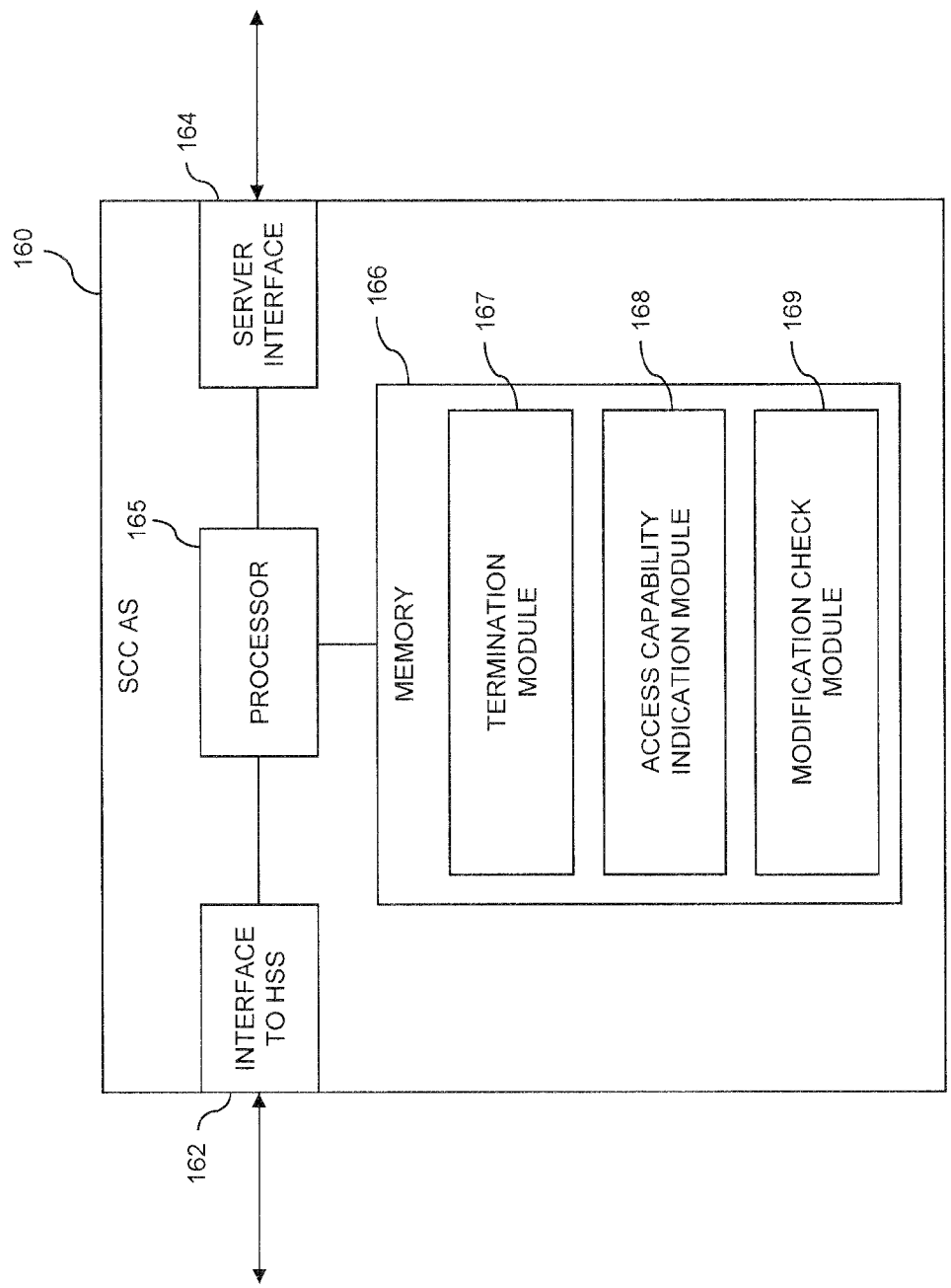
FIG. 12 schematically illustrates a server according to an embodiment of the invention.

FIG. 12 further illustrates an exemplary implementation of a server which may be used to implement the above-mentioned concepts. As explained above, the server may be configured to be operated as an SCC AS according to the 3GPP TSs. In particular, the server may correspond to the SCC AS 160 of FIGS. 4, 5, and 6.

The server 160 includes a HSS interface 162, which has the purpose of coupling the application server to the HSS, e.g., implemented by the subscriber database 150, and a server interface 164, which has the purpose of coupling the server 160 to other servers or network functions, e.g., to the CSCF 170 as illustrated in FIG. 4. The HSS interface 162 may be implemented as a Sh interface according to the 3GPP TSs. The server interface 164 may be implemented as an ISC interface according to the 3GPP TSs. It is to be understood that the interfaces 162 and 164 may be implemented by using one or more suitably configured receivers and transmitters of the server 160.

Further, server 160 includes a processor 165 coupled to the interfaces 162, 164 and a memory 166 coupled to the processor 165. The memory 166 may include a ROM, e.g., a flash ROM, a random-access memory RAM, e.g., a DRAM or SRAM, a mass storage, e.g., a hard disk or solid state disk, or the like. The memory 166 includes suitably configured program code to be executed by the processor 165 so as to implement the functionalities of the subscriber database 160 as explained above. More specifically, the memory 166 may include a termination module 167 so as to control termination of connections in the above-described manner, and an access capability module 168 so as to implement functionalities needed to handle the information with respect to the access capability, e.g., requesting the information from the HSS and, if needed, temporarily storing the information. Further, the memory 166 includes a modification check module 169 so as to implement the above-mentioned functionalities of determining whether the a process of terminating a connection to a UE requires modification in view of an updated indication of the access capability.

It is to be understood that the structure as illustrated in FIG. 12 is merely schematic and that the server 160 may actually include further components which, for the sake of clarity, have not been illustrated. Also, it is to be understood that the memory 166 may include further types of program code modules, which have not been illustrated, e.g., program code modules for implementing known functionalities of a SCC AS according to the 3GPP TSs. Further, it is to be understood that the structures of FIG. 12 are an example of implementing the server with the above-mentioned receiver, transmitter, processing system, and control unit, but that other implementations of the above-mentioned receiver, transmitter, processing system, and control unit are possible as well.

As can be seen, the concepts as described above allow for efficiently handling access capability information which is subject to dynamic changes. The concepts may be implemented with little or no impact on RANs of a 3GPP mobile network. Further, the concepts may be implemented without any impact on existing UEs. For example, RAT selection performed by the UE does not need to be changed. Further, the concepts do not require modifications in nodes of the CS access domain, i.e., there is no CS network impact. Moreover, the concepts can be implemented in an efficient manner by adapting existing procedures of network-assisted T-ADS.

It is to be understood that the examples and embodiments as explained above are merely illustrative and susceptible to various modifications. For example, the concepts could be used in other types of mobile network, which are based on different types or combinations of RANs. Also, the concepts may be applied to handle various types of access capability information, and this information may be provided to various types of server or other network devices or functions. Further, it is to be understood that the above concepts may be implemented by using correspondingly designed software in existing network devices, or by using dedicated network device hardware. The above-mentioned technical specifications, reports, or standards are incorporated herein by reference.

The invention claimed is:

1. A method of controlling communication of a user equipment in a mobile network with a plurality of access networks, comprising:
controlling, by a control node, access of the user equipment to one of the access networks currently used by the user equipment; performing, by the control node, a determination of an access capability of the user equipment in said access network;
providing, by the control node, an indication of the determined access capability to a subscriber database associated with the user equipment;
when providing the indication, starting a guard timer;
after determining the access capability, the control node receiving an update indication for the user equipment;
in response to receiving the update indication, the control node performing a redetermination of the access capability;
checking, by the control node, if the guard timer has expired; and
only if the guard timer has not expired, the control node providing a further indication of the redetermined access capability to the subscriber database.

2. The method according to claim 1, wherein the update indication is a routing area update or a tracking area update.

3. The method according to claim 1, wherein the indication to the subscriber database includes a time stamp.

4. The method according to claim 1, wherein the indication to the subscriber database indicates a radio access technology.

5. The method according to claim 1, wherein the update indication is associated with a move of the user equipment from the control node to a further control node.

6. The method according to claim 5, wherein the control node receives the update indication from the further control node.

7. The method according to claim 5, wherein the control node redetermines the access capability on the basis of the update indication received from the further control node.

8. The method according to claim 1, wherein the control node receives the update indication from the user equipment.

9. The method according to claim 1, wherein the access capability comprises whether voice communication over packet switched access is supported or not.

10. A non-transitory computer program product comprising program code to be executed by a processor of a network device of a mobile network with a plurality of access networks, thereby causing the network device to perform the method of claim 1.

11. A method of controlling communication of a user equipment in a mobile network with a plurality of access networks, comprising:
receiving, from a subscriber database associated with the user equipment, an indication of an access capability of the user equipment in that one of the access networks which is currently used by the user equipment;
on the basis of the received indication, controlling termination of a connection to the user equipment;
receiving, from the subscriber database, a further indication of the access capability of the user equipment;
based on the further indication, performing a check if said controlling termination of the connection to the user equipment requires modification, and
if the further indication indicates that voice communication over packet switched access is supported, deciding to terminate the connection using voice communication over packet switched access.

12. The method according to claim 11, comprising:
controlling termination of the connection to the user equipment on the basis of the further indication.

13. The method according to claim 11, wherein the access capability comprises whether voice communication over packet switched access is supported or not.

14. The method according to claim 13, comprising:
if the further indication indicates that voice communication over packet switched access is not supported, deciding to terminate the connection using circuit switched access.

15. A method of controlling communication of a user equipment in a mobile network with a plurality of access networks, comprising:
receiving, in a subscriber database associated with the user equipment, an indication of an access capability of the user equipment in one of the access networks which is currently used by the user equipment;
transmitting the indication from the subscriber database to a server configured to control termination of connections to the user equipment;
when transmitting the indication, starting a guard timer;
receiving, in the subscriber database, a further indication of the access capability;
checking if the guard timer has expired; and
only if the guard timer has not expired, transmitting the further indication from the subscriber database to the server.

16. The method according to claim 15, comprising:
the subscriber database indicating to a control node whether the subscriber database requests to receive the further indication of the access capability from the control node.

17. The method according to claim 15, comprising:
the subscriber database indicating to the control node a time interval in which the subscriber database requests to receive the further indication of the access capability from the control node.

18. The method according to claim 15, wherein the access capability comprises whether voice communication over packet switched access is supported or not.

19. A control node to be used in a mobile network with a plurality of access networks,
wherein the control node is configured to control access of a user equipment to one of the access networks which is currently used by the user equipment, and
wherein the control node is configured to:
perform a determination of an access capability of the user equipment in said access network;
provide an indication of the determined access capability to a subscriber database associated with the user equipment;
when transmitting the indication, start a guard timer;
after determining the access capability, receive an update indication for the user equipment;
in response to receiving the update indication, perform a redetermination of the access capability;
check if the guard timer has expired; and
only if the guard timer has not expired, provide a further indication of the redetermined access capability to the subscriber database.

20. The control node according to claim 19, wherein the control node is configured to operate to control communication of the user equipment in the mobile network with the plurality of access networks by:
controlling access of the user equipment to one of the access networks currently used by the user equipment;
performing a determination of an access capability of the user equipment in said access network;
providing an indication of the determined access capability to a subscriber database associated with the user equipment;
when providing the indication, starting a guard timer;
after determining the access capability, receiving an update indication for the user equipment;
in response to receiving the update indication, performing a redetermination of the access capability;
checking if the guard timer has expired; and
only if the guard timer has not expired, providing a further indication of the redetermined access capability to the subscriber database.

21. A server to be used in a mobile network with a plurality of access networks, wherein the server is configured to control providing of terminating connections to a user equipment; and wherein the server is configured to:
receive, from a subscriber database associated with the user equipment, an indication of an access capability of the user equipment in one of the access networks which is currently used by the user equipment;
on the basis of the received indication, control termination of a connection to the user equipment;
receive, from the subscriber database, a further indication of the access capability;
based on the further indication, perform a check if said controlling termination of the connection to the user equipment requires modification, and
if the further indication indicates that voice communication over packet switched access is supported, decide to terminate the connection using voice communication over packet switched access.

22. The server according to claim 21, wherein the server is configured to operate to control communication of the user equipment in the mobile network with the plurality of access networks by:
receiving, from the subscriber database associated with the user equipment, an indication of an access capability of the user equipment in that one of the access networks which is currently used by the user equipment;
on the basis of the received indication, controlling termination of a connection to the user equipment;
receiving, from the subscriber database, a further indication of the access capability of the user equipment; and
based on the further indication, performing a check if said controlling termination of the connection to the user equipment requires modification.

23. A subscriber database to be used in a mobile network with a plurality of access networks,
wherein the subscriber database is associated with a user equipment, and
wherein the subscriber database is configured to:
receive an indication of an access capability of the user equipment in one of the access networks which is currently used by the user equipment;
transmit the indication to a server configured to control termination of connections to the user equipment;
when transmitting the indication, start a guard timer;
receive a further indication of the access capability;
check if the guard timer has expired; and
only if the guard timer has not expired, transmit the further indication to the server.

24. The subscriber database according to claim 23, wherein the subscriber database is configured to operate to control communication of the user equipment in the mobile network with the plurality of access networks by:

receiving an indication of an access capability of the user equipment in one of the access networks which is currently used by the user equipment;
transmitting the indication to a server configured to control termination of connections to the user equipment;
when transmitting the indication, starting a guard timer;
receiving a further indication of the access capability;
checking if the guard timer has expired; and
only if the guard timer has not expired, transmitting the further indication to the server.

* * * * *